United States Patent
Kato

(10) Patent No.: US 7,710,917 B2
(45) Date of Patent: May 4, 2010

(54) METHOD COMMUNICATION SYSTEM, RADIO BASE STATION, MOBILE TERMINAL AND DELIVERY METHOD

(75) Inventor: Shugo Kato, Yokohama (JP)

(73) Assignee: Denso Corporation, Kariya (JP)

( * ) Notice: Subject to any disclaimer, the term of this patent is extended or adjusted under 35 U.S.C. 154(b) by 625 days.

(21) Appl. No.: 11/654,793

(22) Filed: Jan. 18, 2007

(65) Prior Publication Data

US 2007/0171865 A1    Jul. 26, 2007

(30) Foreign Application Priority Data

Jan. 20, 2006    (JP)    ............... 2006-012695

(51) Int. Cl.
*H04Q 7/00*    (2006.01)
(52) U.S. Cl. .................. 370/328; 370/331; 455/436; 455/561
(58) Field of Classification Search ............... 370/328, 370/331; 455/436, 561
See application file for complete search history.

(56) References Cited

U.S. PATENT DOCUMENTS

| | | | |
|---|---|---|---|
| 6,760,588 B2 * | 7/2004 | Okajima et al. | ............. 455/437 |
| 6,965,580 B1 * | 11/2005 | Takagi et al. | ................ 370/312 |
| 7,072,663 B2 | 7/2006 | Ramos et al. | |
| 7,209,465 B2 * | 4/2007 | Matsugatani et al. | ........ 370/338 |
| 7,254,409 B2 * | 8/2007 | Sato et al. | .................. 455/466 |
| 7,389,110 B2 * | 6/2008 | Lee | ............................. 455/436 |
| 7,400,601 B2 * | 7/2008 | Moritani et al. | ............. 370/331 |
| 7,420,941 B2 * | 9/2008 | Moon et al. | ................. 370/328 |
| 7,561,880 B2 * | 7/2009 | Moon et al. | ................. 455/436 |
| 2002/0131386 A1 | 9/2002 | Gwon | |
| 2003/0016655 A1 | 1/2003 | Gwon | |
| 2003/0053427 A1 | 3/2003 | Kanda et al. | |
| 2003/0083087 A1 * | 5/2003 | Ekl et al. | .................... 455/518 |
| 2003/0087646 A1 | 5/2003 | Funato et al. | |
| 2003/0157966 A1 * | 8/2003 | Sato et al. | ................... 455/561 |
| 2004/0053606 A1 | 3/2004 | Artamo et al. | |
| 2004/0057402 A1 | 3/2004 | Ramos et al. | |
| 2004/0105420 A1 | 6/2004 | Takeda et al. | |
| 2004/0114554 A1 | 6/2004 | Okajima et al. | |
| 2004/0132486 A1 | 7/2004 | Halonen et al. | |
| 2004/0151135 A1 | 8/2004 | Kitahama et al. | |
| 2004/0151148 A1 | 8/2004 | Yahagi | |
| 2004/0213177 A1 | 10/2004 | Moritani et al. | |
| 2004/0223465 A1 | 11/2004 | Lee et al. | |
| 2005/0195795 A1 | 9/2005 | Aoki et al. | |

FOREIGN PATENT DOCUMENTS

JP    2002-374558    12/2002

(Continued)

*Primary Examiner*—Lester Kincaid
*Assistant Examiner*—Steven Kelley
(74) *Attorney, Agent, or Firm*—Harness, Dickey & Pierce, PLC

(57) ABSTRACT

A mobile communication system uses efficiently a radio band of a previously-connected base station, when a mobile terminal that executes multicast communication moves among radio base stations. The mobile communication system includes a layer-2 switch. Upon switching from one radio base station over to the other radio base station, the mobile terminal transmits a path formation request related to a multicast group via the connected radio base station. The path formation request reaches the wired port of the one radio base station through the layer-2 switch. Here, "leave" of the mobile terminal from the control of the one radio base station is detected, and the delivery of multicast is halted. The other radio base station, on the other hand, starts delivering the multicast.

14 Claims, 17 Drawing Sheets

FOREIGN PATENT DOCUMENTS

| | | |
|---|---|---|
| JP | 2003-110606 | 4/2003 |
| JP | 2003-179616 | 6/2003 |
| JP | 2003-258826 | 9/2003 |
| JP | 2004-135178 | 4/2004 |
| JP | 2004-274652 | 9/2004 |
| JP | 2005-012264 | 1/2005 |

* cited by examiner

METHOD COMMUNICATION SYSTEM, RADIO BASE STATION, MOBILE TERMINAL AND DELIVERY METHOD

CROSS REFERENCE TO RELATED APPLICATION

This application is based on and incorporates herein by reference Japanese Patent Application No. 2006-12695 filed on Jan. 20, 2006.

FIELD OF THE INVENTION

The present invention relates to a mobile communication system which transmits data signals addressed to a predetermined multicast group transmitted from a transmitter to mobile terminals through radio base stations. The present invention also relates to a radio base station used in the mobile communication system, to a mobile terminal and to a method of delivering data signals.

BACKGROUND OF THE INVENTION

According to a conventional communication system, a transmitter specifies a plurality of remote units in a communication network to execute a multicast communication for delivering the same data such as file or dynamic image data. The multicast communication is executed by using a protocol, such as IGMP (internet group management protocol) and MLD (multicast listener discovery). Here, "distribution" is defined as transmitting (and reproducing, if necessary) the data generated by another apparatus in the passage to a plurality of receivers.

When an IP network employing a protocol such as the above IGMP is used, the passage for delivering the multicast packet is established in a direction from a receiver (mobile terminal such as a cell phone or a navigation device) toward a transmitter. Specifically, the receiver transmits an IGMP-join packet (path formation request) to a multicast router to which the receiver is connected (i.e., to a subordinate multicast router). The request for establishing the path includes a group identification data (for example, a group name and a source data) for identifying the multicast group.

Upon receipt of this data, the multicast router registers the requested multicast group of the join packet to its own multicast routing table and transmits a request for establishing a multicast routing path to the multicast router on the transmitter side (i.e., to a superior multicast router). Upon receipt of this request, the multicast router on the transmitter side similarly updates the table, and transmits a request for establishing a multicast routing path. By repeating the above operation, a path is established up to the most significant multicast router.

When a similar join packet to the multicast group is transmitted from a separate receiver, a request is issued to establish a path up to the multicast router of which the path has been established already up to the transmitter. As a result, a path is also established between the receiver and the transmitter.

When the multicast routers have their respective receivers on their respective paths, a multicast packet is distributed (reproduced and transmitted to the paths).

Thus, the multicast router positioned at a branching point where a plurality of multicast distribution paths exist, transmits the multicast packet to only those paths that require the delivery. Therefore, the traffic does not increase unnecessarily, and the band of the network can be effectively utilized.

The IP multicast can be realized by the multicast router which is capable of processing the IP layer (layer 3) which, however, cannot be processed by a data link layer (layer 2) switch. Irrespective of whether the receivers are present on the paths, therefore, the received multicast packet is distributed to all paths inefficiently using the band.

A method called IGMP-snooping is proposed to prevent inefficient use of the band in the layer-2 switch. According to this method, the layer-2 switch receives a join packet (path formation request) from the receiver, makes sure if the receiver is connected to the ports of the layer-2 switch, and delivers the multicast packet to the corresponding ports only to effectively utilize the band.

Here, when the receiver is connected to a relay device such as layer-2 switch via a wire, the relay device must copy the multicast packet by the number of the paths on which the receivers are present and must transmit them. On the other hand, when a plurality of receivers receive the multicast packet via a radio base station, the plurality of receivers are allowed to simultaneously receive electromagnetic wave signals of the multicast packet transmitted by the radio base station. Therefore, the radio base station does not have to copy the multicast packet. Namely, the multicast packet can be delivered to the plurality of receivers using the same band as the one used for transmitting the multicast packet to the one receiver.

As described above, when the receiver is connected to the layer-2 switch via the radio base station, the receiver works as a mobile terminal. The mobile terminal often moves between the radio base stations to which it is connected to switch over the connected radio base stations. In this case, a port of the layer-2 switch to which the previously-connected base station is connected is different from a port of the layer-2 switch to which the radio base station of after having been switched over is connected. To continue the communication while the receiver is moving, therefore, the path for delivering the multicast packet must be switched over in the layer-2 switch before and after the switch over.

Here, the layer-2 switch receives the join packet (path formation request) transmitted from the receiver and recognizes the presence of the receiver ahead of the port and establishes the path. The receiver, however, transmits the join packet only when it takes part in the multicast group and when it receives an IGMP-query packet (request for confirming the presence) from the multicast router.

Therefore, when the receiver which has already taken part in the multicast group moves between the radio base stations, the receiver is no longer allowed to receive the multicast packet until the query packet is transmitted from the multicast router and until the receiver transmits a join packet in response to the query packet. A default value of a transmission interval of query packet of the multicast router is 120 seconds. Therefore, when no receiver taking part in the same multicast group is present under control of the radio base station that is newly connected, it is not allowed to receive the multicast packet for an average of about 60 seconds after it has moved.

Further, when there is no other receiver taking part in the multicast group under control of the previously-connected base station, a query packet is transmitted from the multicast router, and there is no response to the join packet from the radio station of before being switched over. Therefore, the layer-2 switch so recognizes that there is no receiver at the port to which the radio base station is connected.

Therefore, even after the receiver has moved, the multicast packet is delivered from the layer-2 switch to a port to which the previously-connected base station is connected, and the multicast packet is delivered from this radio base station to the radio side. Similarly, therefore, the radio band is inefficiently used an average of about 60 seconds.

In an environment in which the layer-2 switch is connected under control of the multicast router, the radio base station is connected under control of the layer-2 switch, and the receiver is present under control of the radio base station, there is developed a mobile communication system which transmits a join packet (path formation request) by switching over the radio base stations that are to be connected accompanying the motion of the receiver (e.g., US 2004/0213177 corresponding to JP 2004-320725A). According to this mobile communication system, a new delivery path can be established to the layer-2 switch or to the multicast router to shorten the delay time until receiving the multicast packet.

Upon having switched over the radio base station, further, the receiver in this mobile communication system transmits an IGMP-leave packet ("leave" request) to the multicast router to request "leave" from the multicast group. Therefore, the multicast router transmits a query packet and deletes the delivery path depending upon the join packet in response thereto to prevent inefficient use of the radio band in the previously-connected base station.

According to the mobile communication system disclosed in the above publication, however, a leave packet arrives at the multicast router, a query packet in response thereto is transmitted from the multicast router and, further, a join packet must respond to the query packet. These moments inefficiently uses the radio band in the previously-connected base station.

SUMMARY OF THE INVENTION

It is therefore an object of the present invention to provide a mobile communication system capable of preventing inefficient use of a radio band in a previously-connected base station at the time when the base station being connected is switched over by a receiver that is moving between the radio base stations in an environment in which a relay device is connected under control of a transmitter, the radio base stations are connected under control of the relay device, and the receiver is present under control of the radio base stations, a radio base station, a mobile terminal and a method of delivery to the mobile terminal.

In a mobile communication system according to one aspect of the present invention, path formation request transmission unit transmits a path formation request that includes a group identification data for identifying a predetermined multicast group and requests to establish a path for receiving the delivery of data signals at a moment when a mobile terminal takes part in a predetermined multicast group and when a radio base station to which the mobile terminal is connected is switched over while receiving data signals transmitted being addressed to the predetermined multicast group. When a first request detector detects the path formation request transmitted from the mobile terminal present under its control, a multicast delivery table manager unit in the radio base station registers the group identification data included in the path formation request into its own multicast delivery table. When a second request detector detects a path formation request transmitted from various request transmission unit in the radio base stations other than the radio base station thereof, the multicast delivery table manager unit in the radio base station deletes the group identification data included in the path formation request from its own multicast delivery table. Further, a transmission controller unit in the radio base station transmits a multicast packet received from the relay device to the radio network under its control only when the multicast packet received from the relay device is a multicast packet addressed to the multicast group which is the same as the multicast group that has been registered as group identification data in its own multicast delivery table.

Therefore, when the mobile terminal which is in multicast communication moves between the radio base stations to switch over the connected base station, the mobile terminal transmits the path formation request. The path formation request arrives at the previously-connected base station through the radio base station that is newly connected and the wire, and discontinues the delivery of multicast packet to the radio side to thereby prevent the radio band of the previously-connected base station from being inefficiently used.

BRIEF DESCRIPTION OF THE DRAWINGS

The above and other objects, features and advantages of the present invention will become more apparent from the following detailed description made with reference to the accompanying drawings. In the figures.

DETAILED DESCRIPTION OF THE PREFERRED EMBODIMENTS

First Embodiment

Figure 1A:
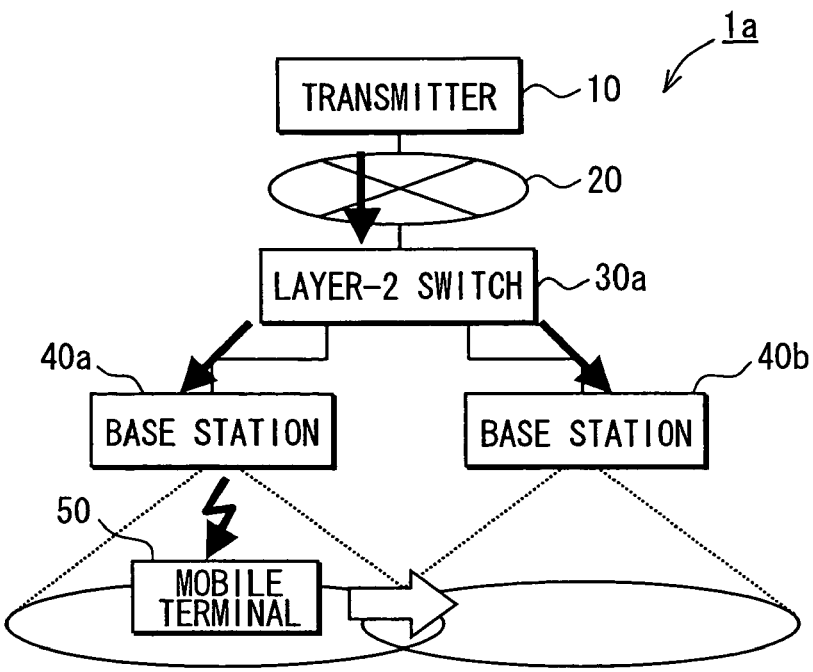
FIG. 1A is a block diagram illustrating a mobile communication system according to a first embodiment of the invention.

Referring first to FIG. 1A, a mobile communication system 1a according to a first embodiment includes a transmitter 10 for transmitting a multicast packet in multicast communication, a layer-2 switch (relay device) 30a for delivering (reproducing and transmitting) the multicast packet from the transmitter 10 via a wired network 20, and radio base stations 40a, 40b for transmitting the packet delivered from the layer-2 switch 30a to radio networks, which are under control of the base stations 40a, 40b in respect of direction of signal transmission.

In this embodiment, the layer-2 switch 30a is connected to the wired network 20 for simplicity. However, the wired network 20 may often be a complex network by utilizing a plurality of multicast routers or layer-2 switches. Circles drawn under the radio base stations 40a, 40b indicate regions where the communication is possible with the respective radio base stations 40a, 40b. A mobile terminal 50 is connected to the radio base station 40a to receive the multicast packet. The transmitter 10 is a data processing terminal, such as a personal computer or a work station. The transmitter 10 transmits, for example, a software, a file data like dynamic image, dynamic image obtained in real time, and traffic information such as traffic jam or accident as a multicast packet.

The layer-2 switch 30a reproduces or copies a multicast packet that is received and delivers it to the radio base stations 40a, 40b. Here, even when a plurality of multicast receivers are present under control of the radio base station 40a, 40b, the radio base station 40a, 40b can deliver the multicast packet through only one time of radio transmission.

Figure 1B:
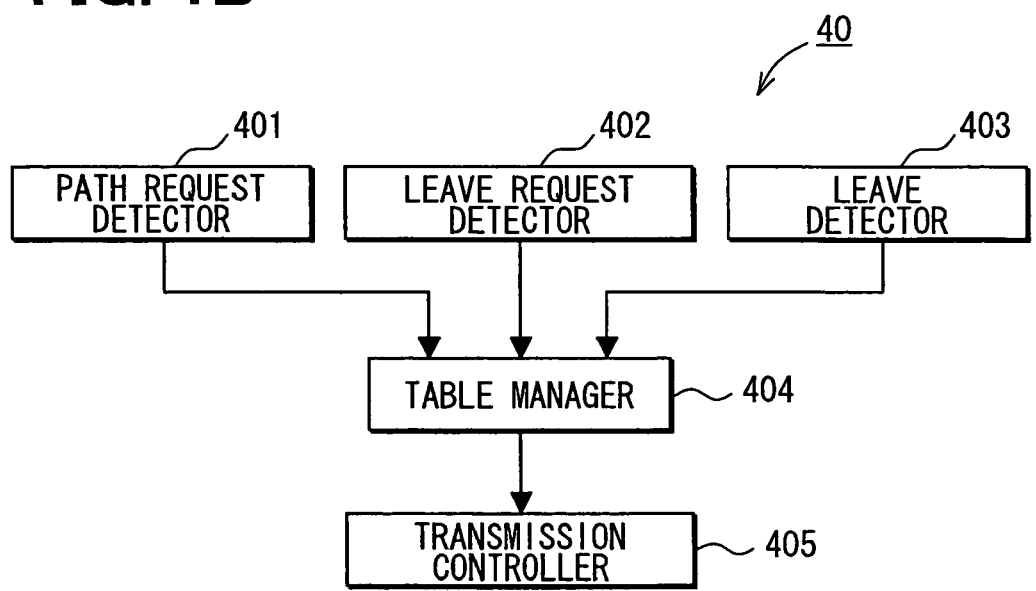
FIG. 1B is a block diagram illustrating a radio base station according to the first embodiment of the invention.

Referring to FIG. 1B, each radio base station 40a, 40b designated with reference numeral 40, includes, as functional components, a path formation request detector unit (first request detection means) 401, a "leave" request detector unit (first request detection means) 402, a "leave" detector unit (second request detection means) 403, a multicast delivery table manager unit (multicast delivery table managing means) 404, and a transmission controller unit (transmission control means, various requests transmission means) 405. The path formation request detector unit 401 detects the request from the mobile terminal present under control of the radio base station 40a, 40b for establishing a path for delivering the multicast.

The "leave" request detector unit 402 detects a request for withdrawing from the multicast group received from the mobile terminal present under control of the radio base station 40a, 40b, and a request for withdrawing from the multicast group received from a mobile terminal present under control of other radio base stations via the other radio base stations.

The "leave" detector unit 403 detects the "leave" of the mobile terminal from its control upon receiving the path formation request for multicast delivery from the mobile terminal present under control of the other radio base station through the other radio base station.

The multicast delivery table manager unit 404 registers to the multicast delivery table in the radio base station 40a, 40b which multicast groups are requested by the mobile terminals and deletes them therefrom based on the detections by the path formation request detector unit 401, "leave" request detector unit 402 and "leave" detector unit 403. That is, group identification data (group name and source (IP address, MAC address, etc.)) for identifying the multicast group are registered to, and deleted from, the multicast delivery table.

The transmission controller unit 405 checks whether the data signals delivered by multicast be output to the radio side (radio network side) based on the multicast delivery table. That is, the multicast packet received from the layer-2 switch 30a is transmitted to the radio network under its control only when the multicast packet received from the layer-2 switch 30a is a multicast packet addressed as group identification data to the multicast group which is the same as the multicast group registered to the multicast delivery table thereof. Further, the transmission controller unit 405 transmits various requests detected by the path formation request detector unit 401 or the "leave" request detector unit 402 to the layer-2 switch 30a (various-requests transmission means).

The mobile terminal 50 is a multicast receiver. The mobile terminal 50 transmits a path formation request for multicast delivery to the multicast router present in the wired network 20 via the radio base station 40a to which it is connected so as to receive a multicast packet addressed to a desired multicast group (path formation request means). When the reception of the multicast packet becomes unnecessary, the mobile terminal 50, similarly, transmits a request of "leave" from the multicast group via the connected radio base station 40a ("leave" request transmission means). Further, when the mobile terminal 50 has moved to the under-control of the radio base station 40b from the control of the radio base station 40a while in multicast communication, the mobile terminal 50 transmits a path formation request for multicast delivery via the newly-connected radio base station 40b (path formation request transmission means).

The radio base stations 40a, 40b are so constructed as to transmit base station identification data for identifying themselves, and the mobile terminal 50 is so constituted as to receive the base station identification data transmitted from the radio base station 40a or 40b to which it is connected (base station identification data-obtaining means). Therefore, the mobile terminal 50 is capable of identifying the radio base station 40a or 40b to which it is connected based on the base station identification data that is received, and can, further, recognize the switch-over of the radio base stations 40a, 40b due to the motion of the mobile terminal 50 itself.

Described below are the operation of the mobile communication system 1a when the mobile terminal 50 in the mobile communication system 1a receives a multicast packet addressed to a predetermined multicast group, and a method of delivery to the mobile terminal realized by using the mobile communication system 1a. The address of the multicast group (referred to as multicast group G) is specified like "225.0.0.1".

In FIG. 1A, a multicast delivery path to the mobile terminal 50 has been formed or established already. Described below first is how to establish the delivery path. In order to receive a multicast packet addressed to the multicast group G, the mobile terminal 50 transmits a path formation request for the multicast delivery so as to reach the multicast router connected to the upstream thereof (upward in the figure). The path formation request addressed to the multicast group G also plays the role of a multicast packet delivery request addressed to the multicast group G and a request for subscription to the multicast group G.

The radio base stations 40a, 40b as a rule do not transmit the multicast packet arriving from the wired side (transmitter 10 side) to the radio side, that is, in the downward direction in the figure. The mobile terminal 50 transmits a path formation request for the multicast delivery in order to receive a multicast packet addressed to the multicast group G under control of the radio base station 40a. The path formation request reaches the radio base station 40a from the radio side, and reaches the radio base station 40b from the wired side through the radio base station 40a and the layer-2 switch 30a.

The path formation request further reaches the multicast router present in the wired network 20. The path formation request is a multicast or a broadcast. Here, the path formation request detector unit 401 in the radio base station 40a detects the path formation request of multicast delivery from the mobile terminal 50 present under its control. The path formation request detector unit 401 may have any physical principle provided it is capable of detecting which multicast packet addressed to the multicast group the mobile terminal 50 under control of the radio base station 40a wishes to receive. For example, the path formation request detector unit 401 may be the one which detects a broadcast packet which includes data representing to which multicast group it is addressed.

When it is detected that the mobile terminal 50 wishes to receive a multicast packet addressed to the multicast group G, the radio base station 40a registers the multicast group G to the multicast delivery table in the multicast delivery table manager unit 404. On the other hand, the "leave" detector unit 403 in the radio base station 40b detects the path formation request of the mobile terminal 50 for the multicast delivery reaching from the wired side via the radio base station 40a. In response to this detection, the radio base station 40b, usually, deletes the multicast group G from the multicast delivery table in the multicast delivery table manager unit 404. In this case, however, nothing is done since nothing has been registered in advance.

In response to the path formation request that has reached, the multicast router present in the wired network 20 establishes, in the wired network 20, a path for the multicast packet addressed to the multicast group G. Thus, a path for delivering the multicast is established from the transmitter 10 to the mobile terminal 50.

When the multicast delivery path is established from the transmitter 10 to the mobile terminal 50, the multicast packet transmitted from the transmitter 10 arrives at the mobile terminal 50 via the wired network 20, layer-2 switch 30a and radio base station 40a. The layer-2 switch 30a delivers the multicast packet to the radio base station 40b. In the radio base station 40b, however, the transmission controller unit 405 makes reference to the multicast delivery table and does not deliver the multicast packet to the radio side if it is the one addressed to the multicast group G. Therefore, the multicast packet can be delivered to only those receivers that require the multicast packet without inefficiently using the radio band.

When the multicast packet addressed to the multicast group G need not be received any more, the mobile terminal 50 transmits a request for "leave" from the multicast group G. Upon receipt of the "leave" request, the radio base station 40a deletes the multicast group G from the multicast delivery table as requested by the mobile terminal 50. When there is present a mobile terminal other than the mobile terminal 50 that wishes to continuously receive the multicast packet addressed to the multicast group G under control of the radio base station 40a, the multicast delivery table in the radio base station 40a already has a multicast group G registered therein by the mobile terminal other than the mobile terminal 50. Therefore, it does not occur that the multicast delivery path is undesirably deleted despite there is present a mobile terminal that wishes to continuously receive the multicast packet addressed to the multicast group G.

Figure 2A:
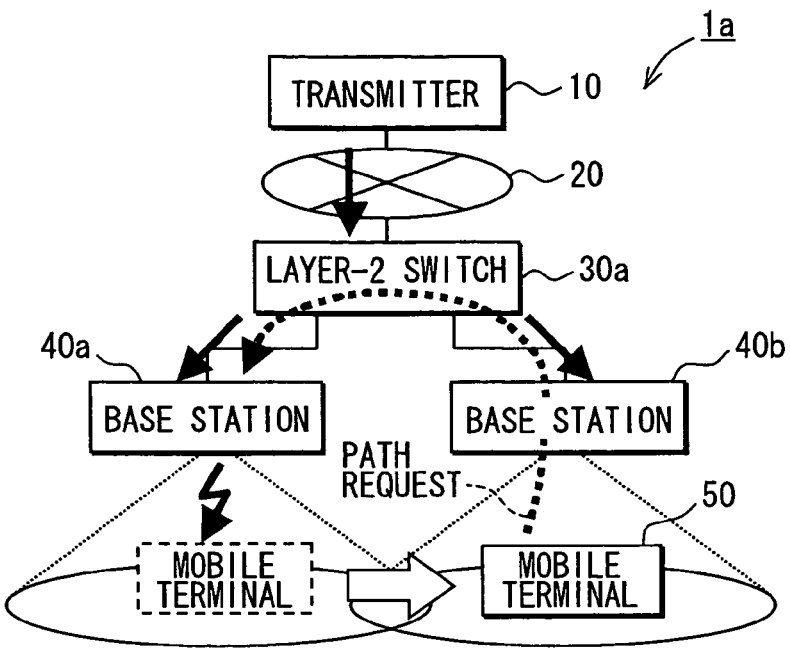
FIGS. 2A and 2B are diagrams illustrating the mobile communication system according to the first embodiment of the present invention.
Figure 2B:
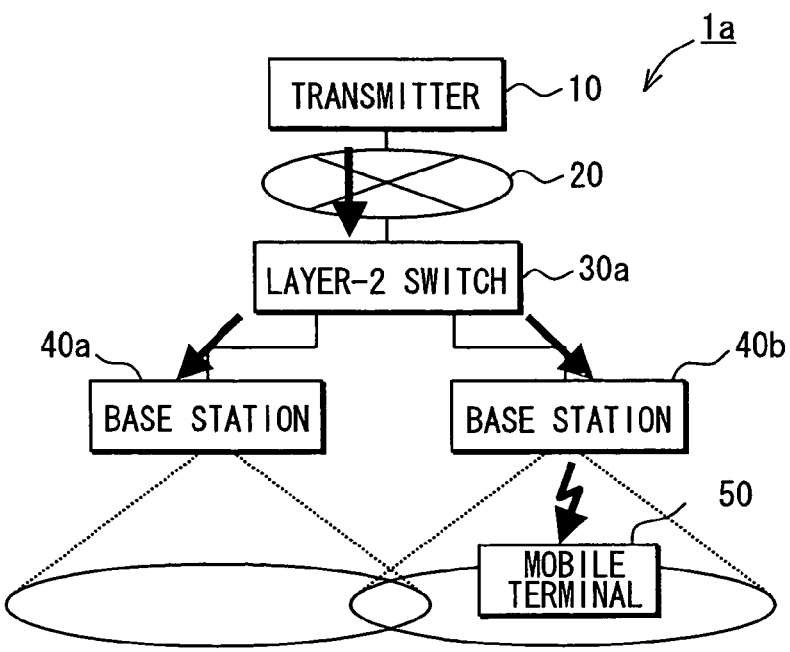

Described below is the operation for switching the connected radio base station from the radio base station 40a over to the radio base station 40b as shown in FIGS. 2A and 2B accompanying the motion of the mobile terminal 50 as indicated by an arrow in a state where the mobile terminal 50 is a subscriber to the multicast group G and is receiving the multicast packet via the radio base station 40a as shown in FIG. 1A.

Referring to FIG. 2A, after having switched the connected radio base station from the radio base station 40a over to the radio base station 40b, the mobile terminal 50 transmits a path formation request related to the multicast group G though the radio base station 40b that is connected after having been switched over as indicated by an arrow of a dotted line in FIG. 2A. The path formation request further reaches the wired port of the radio base station 40a through the layer-2 switch 30a.

Here, the "leave" detector unit 403 in the radio base station 40a detects the "leave" of the mobile terminal 50 from its control, and the multicast delivery table manager unit 404 deletes the data of mobile terminal 50 from the multicast delivery table. In the radio base station 40b, on the other hand, the path formation request detector unit 401 detects the path formation request of the mobile terminal 50 for the multicast delivery, and the multicast delivery table manager unit 404 registers the data of the mobile terminal 50 to the multicast delivery table.

Then, as shown in FIG. 2B, the radio base station 40a halts the delivery addressed to the multicast group G, and the radio base station 40b starts the delivery addressed to the multicast group G. That is, as a result of switching over the connected radio base station, the mobile terminal 50 issues a path formation request and is allowed to receive a multicast packet addressed to the multicast group G through the radio base station 40b. At the same time, it is allowed to recognize the mobile terminal that has moved away from the control of the radio base station 40a, and the delivery addressed to the multicast group G can be quickly halted.

When the mobile terminal 50 is connected to the radio base station 40b after it has transmitted a request for "leave" from the multicast group G outside the under-control of the radio base station, a request for "leave" is transmitted again via the radio base station 40b after the mobile terminal 50 is connected to the radio base station 40b. The "leave" request reaches the radio base station 40a like the path formation request described above. Here, in the radio base station 40a, the "leave" detector unit 403 detects the "leave" of the mobile terminal 50 from the under its control, and the multicast delivery table manager unit 404 deletes the data of the mobile terminal 50 from the multicast delivery table. It is therefore allowed to recognize the mobile terminal that has moved away from the control of the radio base station 40*a*, and the delivery addressed to the multicast group G can be quickly halted.

Figure 3:
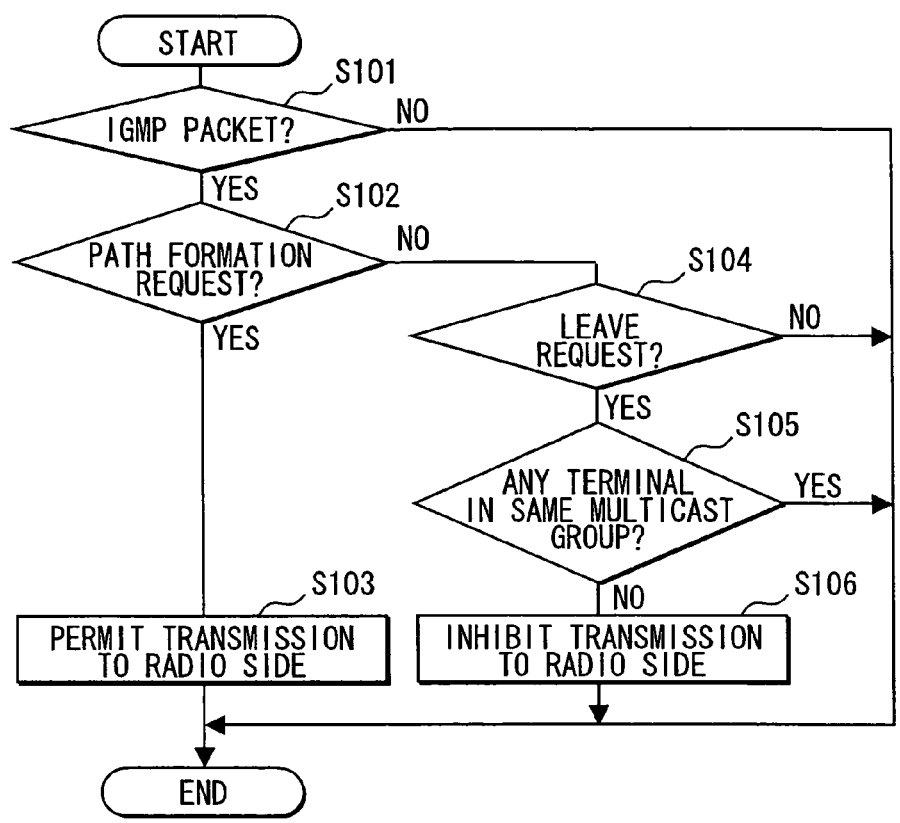
FIG. 3 is a flowchart illustrating a method of delivery to a mobile terminal according to the first embodiment of the invention.

The base station 40*a*, 40*b* perform the processing shown in FIG. 3, when the IGMP packet (path formation request or "leave" request) is to be received from the radio side of the radio base station in FIG. 1A to FIG. 2B. The radio base station 40*a*, 40*b* checks whether the packet received from the radio side is the IGMP packet (step S101). If it is the IGMP packet, it is checked whether it is the path formation request or the "leave" request (steps S102 and S104). If it is the path formation request, a multicast packet addressed to the requested multicast group is permitted to be transmitted to the radio side (step S103). If it is the "leave" request, it is checked whether there is any other mobile terminal under its control requesting the reception of the multicast packet addressed to the requested multicast group (step S105). If there is no mobile terminal that requests the reception, the multicast packet addressed to the requested multicast group is inhibited from being transmitted to the radio side (step S106).

Figure 4:
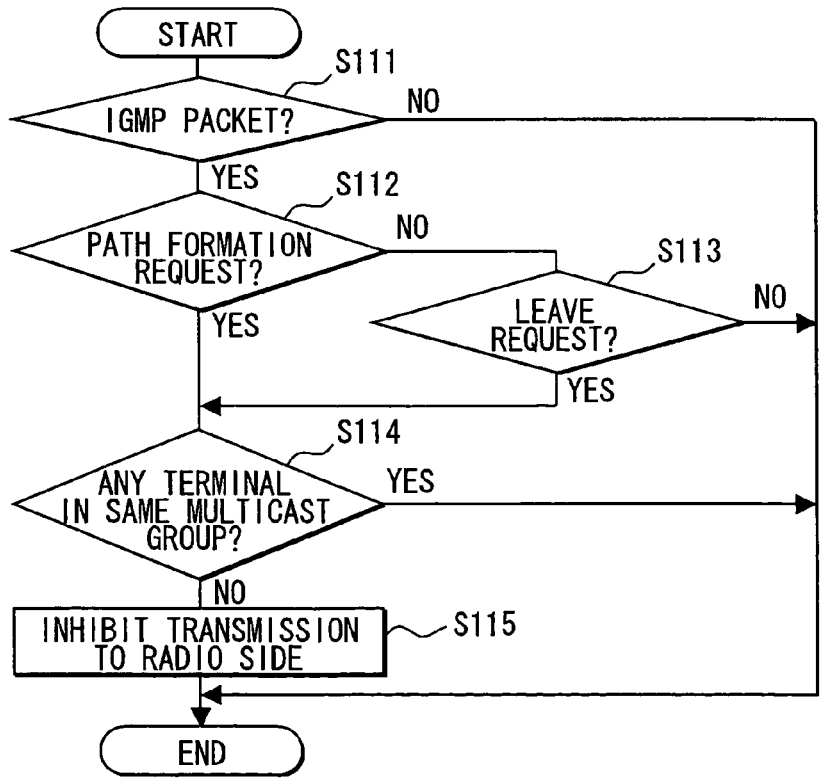
FIG. 4 is a flowchart illustrating a method of delivery to the mobile terminal according to the first embodiment of the invention.

The base station 40*a*, 40*b* perform the processing shown in FIG. 4, when the IGMP packet (path formation request or "leave" request) is to be received from the wired side of the radio base station in FIG. 1A to FIG. 2B. The radio base station checks whether the packet received from the wired side is the IGMP packet (step S111). If it is the IGMP packet, it is checked whether it is the path formation request or the "leave" request (steps S112 and S113). If it is the path formation request or the "leave" request, it is checked whether there is any other mobile terminal under its control requesting the reception of the multicast packet addressed to the requested multicast group (step S114). If there is no mobile terminal that requests the reception, the multicast packet addressed to the requested multicast group is inhibited from being transmitted to the radio side (step S115).

As the radio base station 40*a*, 40*b* perform these processing, reception of the multicast packet can be started readily after the movement of the mobile-terminal 50. Besides, the multicast delivery path previously-connected before being switched over can be quickly deleted to effectively utilize the radio band. Further, the presence of the mobile terminal 50 requesting the multicast packet addressed to the same multicast group has been confirmed by the multicast delivery table before the multicast delivery path is deleted by the radio base station 40*a*, 40*b*. Therefore, it does not occur that the multicast delivery path is undesirably deleted.

Second Embodiment

Figure 5:
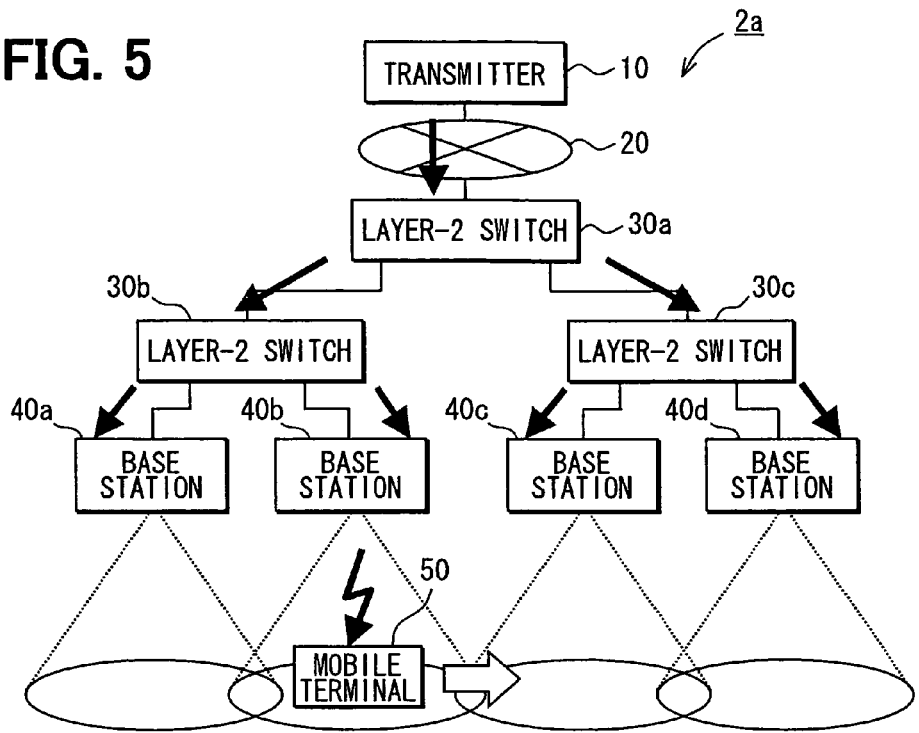
FIG. 5 is a block diagram illustrating the mobile communication system according to a second embodiment of the invention.

A mobile communication system 2*a* according to a second embodiment is shown in FIG. 5. In the first embodiment description, a plurality of radio base stations 4*a*, 4*b* are connected under control of the same single layer-2 switch 20. In the second embodiment, however, layer-2 switches 30*a*, 30*b*, 30*c* are connected in a tree structure. Radio base stations 40*a* to 40*d* connected to the layer-2 switches 30*a* to 30*c* observe the path formation request or the "leave" request from the mobile terminal 50 as described above, and separately execute the processings related to their own multicast delivery tables for every mobile terminal 50 in order to readily halt the delivery of the multicast packet to the radio areas where there is no receiver, to cut the delivery of unnecessary multicast packets and to prevent the radio band from being inefficiently used. That is, mobile terminal identification data for identifying the mobile terminal 50 are registered to, or deleted from, the multicast delivery table in addition to the group identification data for identifying the multicast group for each of the mobile terminals 50.

In FIG. 5, the mobile terminal 50 is a subscriber to the multicase group G and is receiving the multicast packet via the radio base station 40*b*. Described below is the operation of when the mobile terminal 50 moves in this state as indicated by an arrow in the figure to switch the connection of the radio base station from the radio base station 40*b* over to the radio base station 40*c*.

Figure 6A:
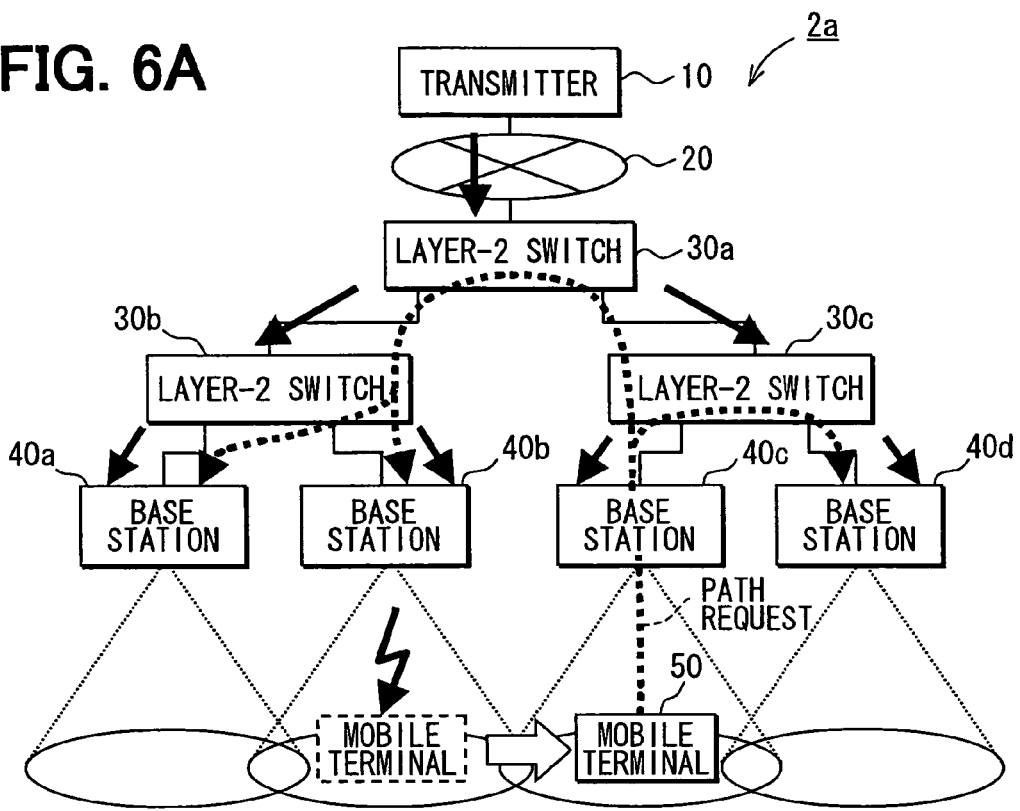
FIGS. 6A and 6B are diagrams illustrating the mobile communication system according to the second embodiment of the present invention.

Referring to FIG. 6A, after having switched the connected radio base station from the radio base station 40*b* over to the radio base station 40*c*, the mobile terminal 50 transmits a path formation request related to the multicast group G though the radio base station 40*c* that is connected after having been switched over as indicated by an arrow of a dotted line.

The path formation request further reaches the wired port of the radio base station 40*b* through the layer-2 switches 30*c*, 30*a* and 30*b*. Here, the "leave" detector unit 403 in the radio base station 40*b* detects the "leave" of the mobile terminal 50 from its control, and the multicast delivery table manager unit 404 deletes the data of mobile terminal 50 from the multicast delivery table. In the radio base station 40*c*, on the other hand, the path formation request detector unit 401 detects the path formation request of the mobile terminal 50 for the multicast delivery, and the multicast delivery table manager unit 404 registers the data of the mobile terminal 50 to the multicast delivery table.

Figure 6B:
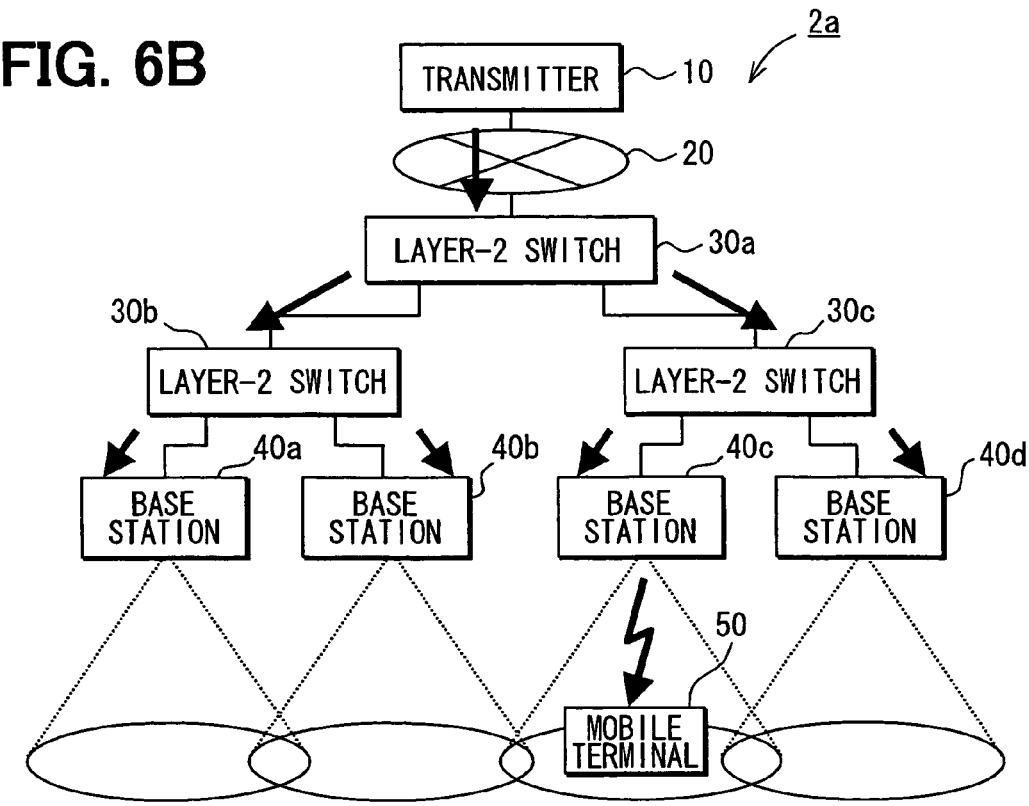

Then, as shown in FIG. 6B, the radio base station 40*b* halts the delivery addressed to the multicast group G, and the radio base station 40*c* starts the delivery addressed to the multicast group G. That is, as a result of switching over the connected radio base station, the mobile terminal 50 issues the path formation request and is allowed to receive the multicast packet addressed to the multicast group G through the radio base station 40*c*. At the same time, it is allowed to recognize the mobile terminal that has moved away from the control of the radio base station 40*b*, and the delivery addressed to the multicast group G can be quickly halted.

When the mobile terminal 50 is connected to the radio base station 40*c* after it has transmitted a request for "leave" from the multicast group G outside the control of the radio base station, a request for "leave" is transmitted again via the radio base station 40*c* after the mobile terminal 50 is connected to the radio base station 40*c*. The "leave" request reaches the radio base station 40*b* like the path formation request described above. Here, in the radio base station 40*b*, the "leave" detector unit 403 detects the "leave" of the mobile terminal 50 from its control, and the multicast delivery table manager unit 404 deletes the data of the mobile terminal 50 from the multicast delivery table. It is therefore allowed to recognize the mobile terminal 50 that has departed away from the control of the radio base station 40*b*, and the delivery addressed to the multicast group G can be quickly halted.

Third Embodiment

Figure 7A:
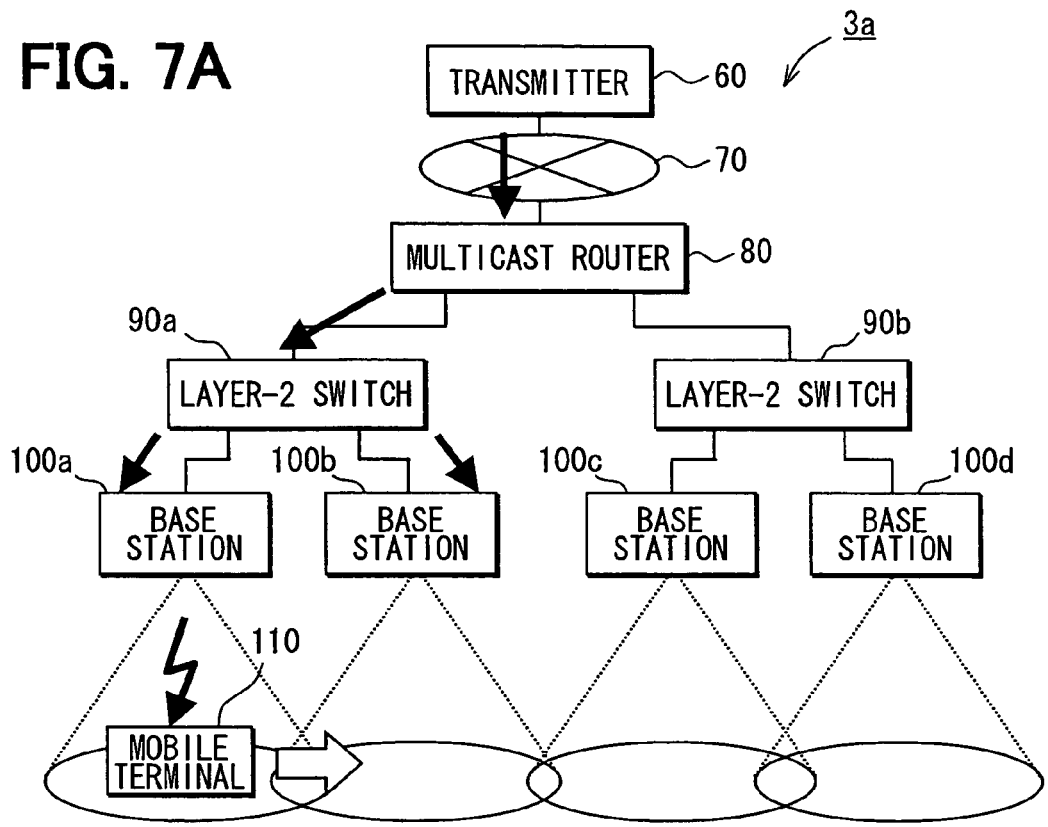
FIG. 7A is a block diagram illustrating the mobile communication system according to a third embodiment of the invention.

A mobile communication system 3*a* according to a third embodiment is shown in FIG. 7A. The mobile communication system 3*a* includes a transmitter 60 for transmitting a multicast packet in multicast communication, a multicast router 80 for delivering (reproducing and transmitting) the multicast packet arriving from the transmitter 60 through a wired network 70, layer-2 switches 90*a*, 90*b* for delivering the multicast packet delivered from the multicast router 80 to radio base stations under its control, and radio base stations

100*a*, 100*b*, 100*c*, 100*d* for transmitting the packet delivered from the layer-2 switches 90*a*, 90*b* to the radio networks under its control.

The wired network 70 may often be a complex network by utilizing a plurality of multicast routers or layer-2 switches. A mobile terminal 110, at first, is connected to the radio base station 100*a* to receive a multicast packet.

The transmitter 60 transmits, for example, a software, a file data like dynamic image, dynamic image obtained in real time, and traffic information such as traffic jam or accident as a multicast packet.

The multicast router 80, as required, reproduces the multicast packet that is received and delivers it to the layer-2 switches 90*a* and 90*b* under its control.

The layer-2 switches 90*a* and 90*b* copy the multicast packet that is received and deliver it to the radio base stations 100*a*, 100*b*, 100*c*, 100*d* under its control. Here, even when a plurality of multicast receivers are present under control of the radio base station, the radio base station can deliver the multicast packet through only one time of radio transmission.

Figure 7B:
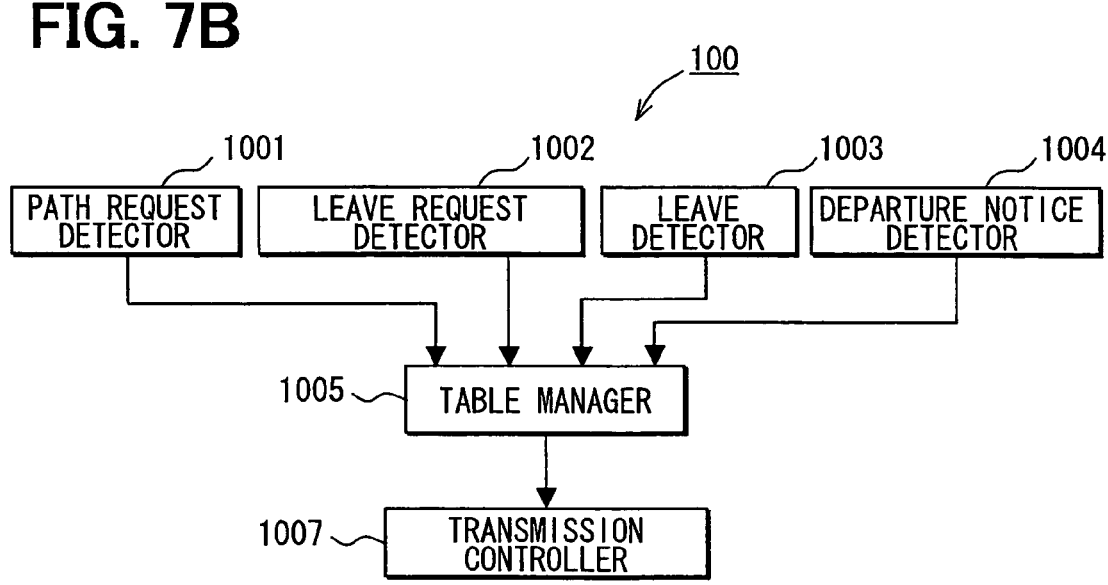
FIG. 7B is a block diagram illustrating the radio base station according to the third embodiment of the invention.

Referring to FIG. 7B, the radio base stations 100*a*, 100*b*, 100*c*, 100*d*, respectively, include, as functional components, a path formation request detector unit 1001 (first request detection means), a "leave" request detector unit 1002 (first request detection means), a "leave" detector unit 1003 (second request detection means), a departure notice detector unit 1004 (second request detection means), a multicast delivery table manager unit 1005 (multicast delivery table managing means), and a transmission controller unit 1007 (transmission control means). The path formation request detector unit 1001 detects the request from the mobile terminal present on the under control of the radio base station thereof for establishing a path for delivering the multicast.

The "leave" request detector unit 1002 detects a request for withdrawing from the multicast group received from the mobile terminal present under its control, and a request for withdrawing from the multicast group received from the mobile terminal present under control of the other radio base station via the other radio base station.

The "leave" detector unit 1003 detects the "leave" of the mobile terminal from its control upon receiving the path formation request for multicast delivery from the mobile terminal present under the other radio base station through the other radio base station.

The departure notice detector unit 1004 detects the "leave" of the mobile terminal from its control upon receiving a departure notice from the mobile terminal that has withdrawn from its control via the other radio base station.

The multicast delivery table manager unit 1005 registers to the multicast delivery table in the radio base station which multicast group is requested by the mobile terminal and deletes it therefrom based on the detections by the path formation request detector unit 1001, "leave" request detector unit 1002, "leave" detector unit 1003 and departure notice detector unit 1004.

The transmission controller unit 1007 checks whether the data signals delivered by multicast be output to the radio side based on the multicast delivery table.

The mobile terminal 110 is a multicast receiver. The mobile terminal 110 transmits a path formation request for multicast delivery to the multicast router 80 via the radio base station to which it is connected so as to receive a multicast packet addressed to a desired multicast group. When the reception of the multicast packet becomes unnecessary, the mobile terminal 110, similarly, transmits a request of "leave" from the multicast group via the connected radio base station. Further, when the mobile terminal 110 has moved to the control of the radio base station 100*b* from the control of the radio base station 100*a* while in multicast communication, the mobile terminal 110 transmits a path formation request for multicast delivery via the newly connected radio base station 100*b* and a departure notice to the radio base station 100*a* (departure notice transmission means).

The mobile communication system 3*a* operates to deliver to the mobile terminal as follows, when the mobile terminal 110 in the mobile communication system 3*a* receives a multicast packet addressed to a predetermined multicast group. Described below is the operation for switching the connected radio base station from the radio base station 100*a* over to the radio base station 100*b*, and to the radio base station 100*c* as shown in FIG. 7A accompanying the motion of the mobile terminal 110 as indicated by an arrow in a state where the mobile terminal 110 is a subscriber to the multicast group G and is receiving the multicast packet via the radio base station 100*a*. In FIG. 7A, the mobile terminal 110 authenticates the radio link when connected to the radio base station 100*a*, and obtains an IP address or a MAC address of the radio base station 100*a*.

Figure 8A:
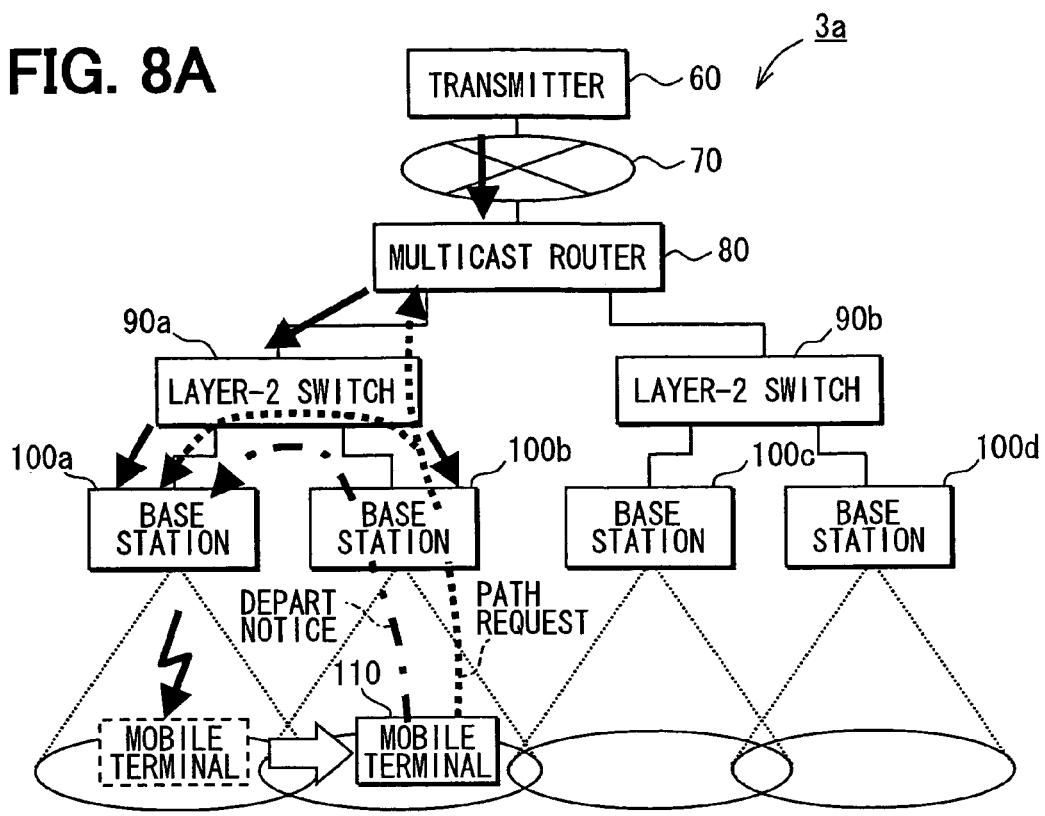
FIGS. 8A and 8B are block diagrams illustrating the mobile communication system according to the third embodiment of the present invention.

Referring to FIG. 8A, as the mobile terminal 110 moves as indicated by an arrow and switches the connected radio base station over to the radio base station 100*b*, the mobile terminal 110 authenticates the radio link relative to the radio base station 100*b* and obtains the IP address or the MAC address of the radio base station 100*b*. As indicated by an arrow of a dotted line in the figure, on the other hand, the mobile terminal 110 transmits a path formation request related to the multicast group G via the radio base station 100*b* that is connected after having been switched over. As indicated by an arrow of a dot-dash chain line in the figure, further, the mobile terminal 110 transmits, with a unicast, the departure notice to the radio base station 100*a* based on the IP address or the MAC address of the radio base station 100*a* that has been obtained before it is switched over.

The path formation request reaches the wired port of the radio base station 100*a* and the multicast router 80 via the layer-2 switch 90*a*. Further, departure notice reaches the wired port of the radio base station 100*a* via the layer-2 switch 90*a*. Here, the "leave" detector unit 1003 or the departure notice detector unit 1004 in the radio base station 100*a* detects the "leave" of the mobile terminal 110 from its control, and the multicast delivery table manager unit 1005 deletes the data of mobile terminal 110 from the multicast delivery table. In the radio base station 100*b*, the path formation request detector unit 1001 detects the path formation request of the mobile terminal 110 for the multicast delivery, and the multicast delivery table manager unit 1005 registers the data of the mobile terminal 110 to the multicast delivery table.

Figure 8B:
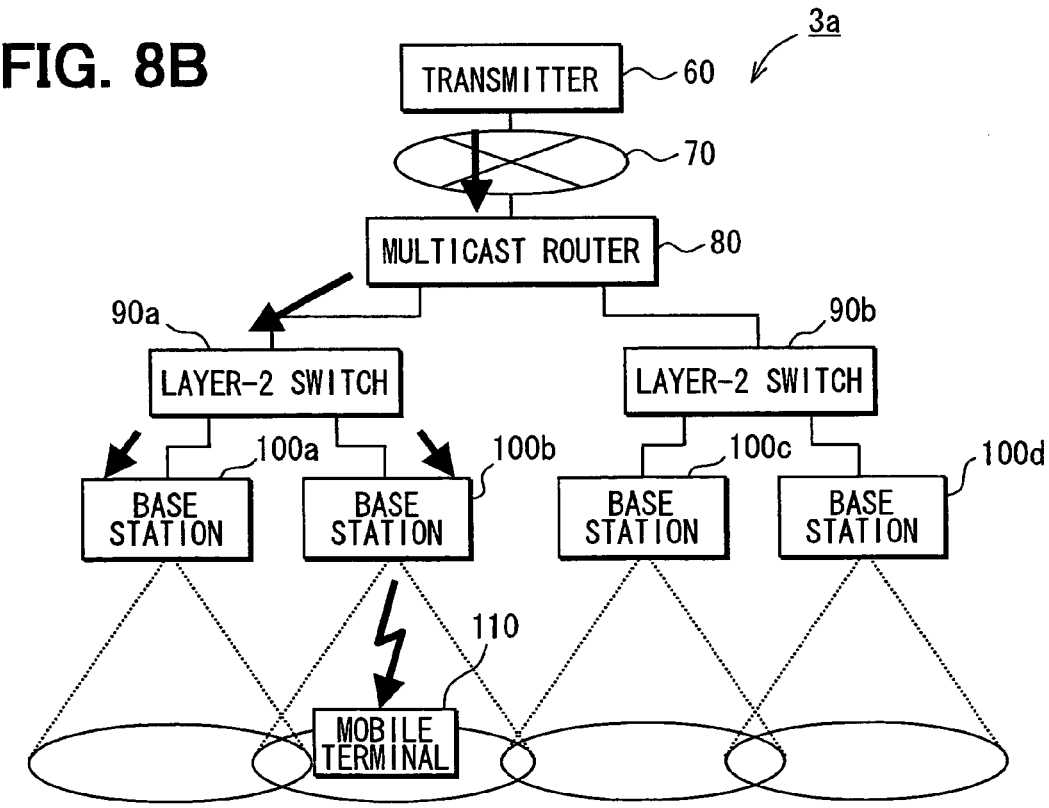

Then, as shown in FIG. 8B, the radio base station 100*a* halts the delivery addressed to the multicast group G, and the radio base station 100*b* starts the delivery addressed to the multicast group G. That is, due to the path formation request and the departure notice from the mobile terminal 110 as a result of switching over the connected radio base station, the mobile terminal 110 receives the multicast packet addressed to the multicast group G through the radio base station 100*b*. At the same time, it is allowed to recognize the mobile terminal that has withdrawn from the control of the radio base station 100*a*, and the delivery addressed to the multicast group G can be quickly halted.

When the mobile terminal 110 is connected to the radio base station 100*b* after it has transmitted a request for "leave" from the multicast group G outside the control of the radio base station 100*a*, a "leave" request and a departure notice are transmitted again via the radio base station 100*b* after the mobile terminal 110 is connected to the radio base station 100b. The "leave" request and the departure notice reach the radio base station 100a like the path formation request described above. Here, in the radio base station 100a, the "leave" detector unit 1003 or the departure notice detector unit 1004 detects the "leave" of the mobile terminal 110 from its control, and the multicast delivery table manager unit 1005 deletes the data of the mobile terminal 110 from the multicast delivery table. It is therefore allowed to recognize the mobile terminal that has departed away from the control of the radio base station 100a, and the delivery addressed to the multicast group G can be quickly halted.

Figure 9A:
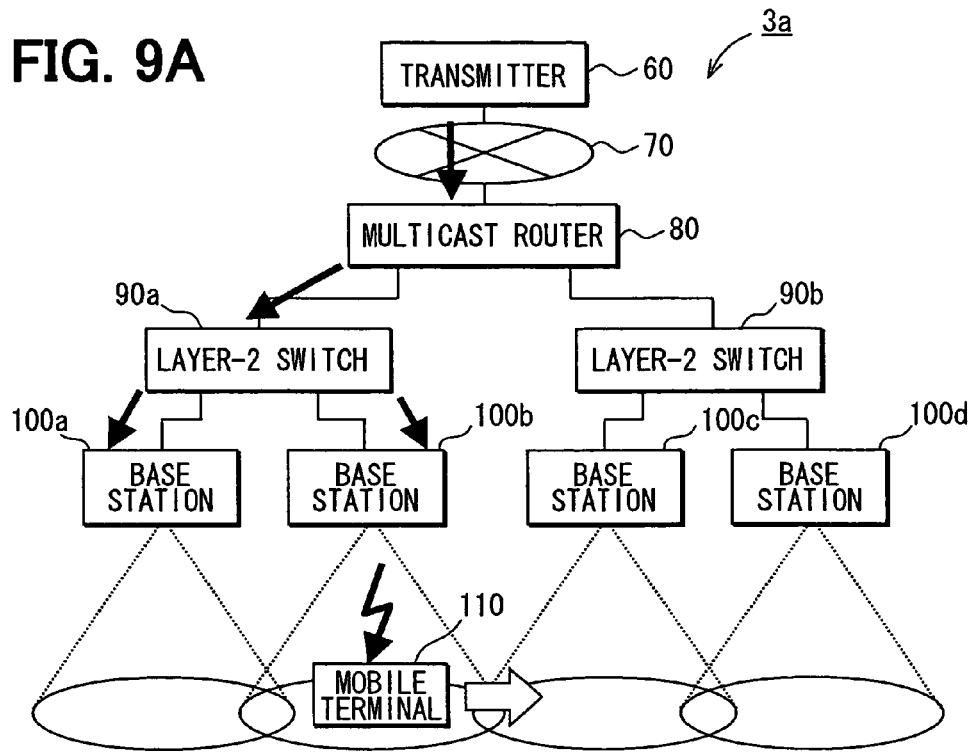
FIGS. 9A and 9B are block diagrams illustrating the mobile communication system according to the third embodiment of the present invention.
Figure 9B:
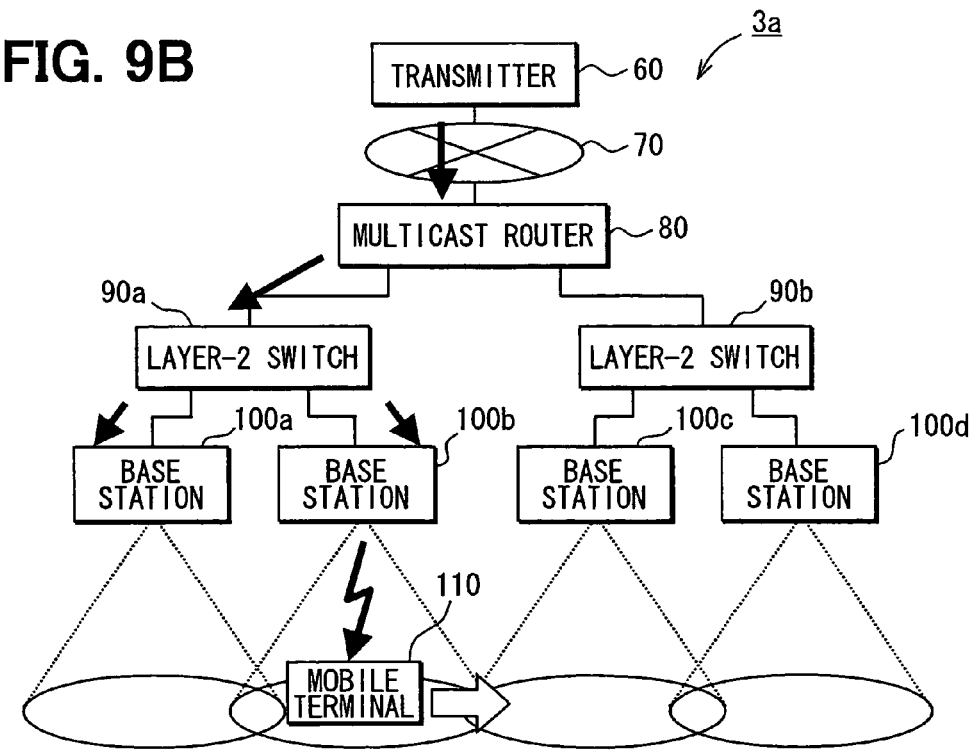

Next, described below is a case where the mobile terminal 110 moves between the radio base stations connected to different subnets as shown in FIG. 9A. After having switched the connected radio base station from the radio base station 100b over to the radio base station 100c as shown in FIG. 9B, the mobile terminal 110 transmits a path formation request related to the multicast group G though the radio base station 100c that is connected after having been switched over as indicated by an arrow of a dotted line in FIG. 10A. Therefore, the radio base station 100c starts the delivery addressed to the multicast group G. However, the path formation request cannot pass through the multicast router and does not reach the radio base station 100b.

Figure 10A:
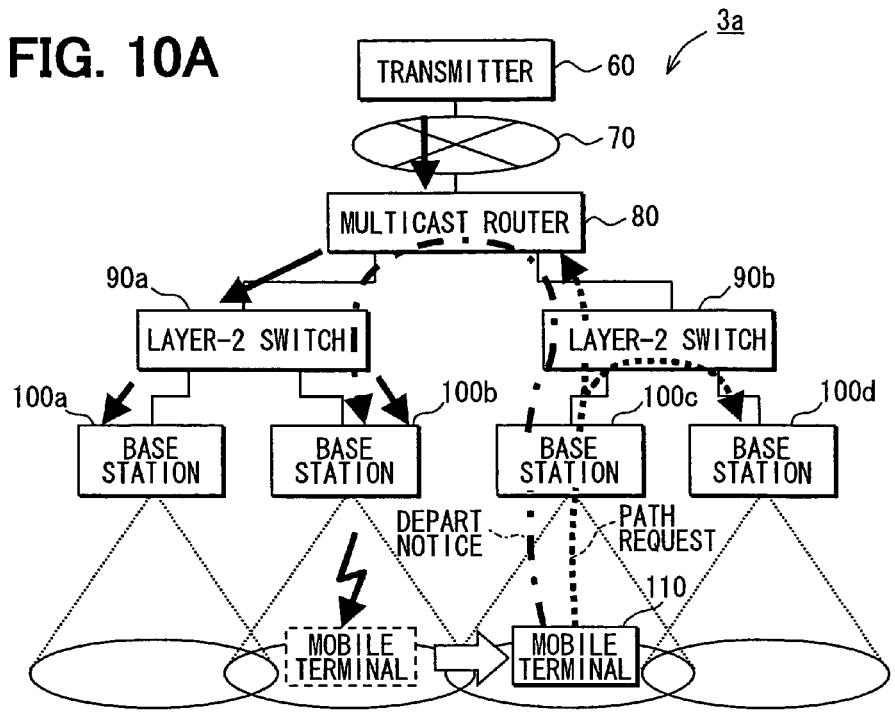
FIGS. 10A and 10B are block diagrams illustrating the mobile communication system according to the third embodiment of the present invention.

On the other hand, the departure notice as indicated by an arrow of a dot-dash chain line in FIG. 10A is transmitted in unicast to the radio base station 100b based on the IP address or the MAC address of the radio base station 100b that has been obtained before it is switched over. Here, the departure notice detector unit 1004 in the radio base station 100b detects the absence of the mobile terminal 110 under its control, and the multicast delivery table manager unit 1005 deletes the data of the mobile terminal 110 from the multicast delivery table.

Figure 11:
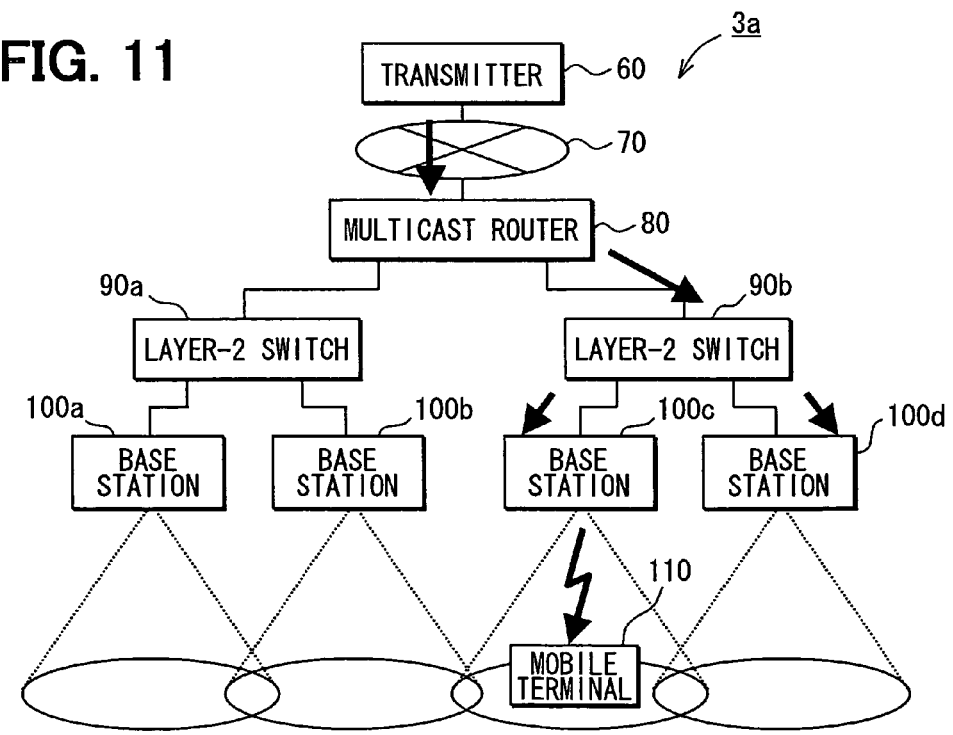
FIG. 11 is a block diagram illustrating the mobile communication system according to the third embodiment of the present invention.
Figure 10B:
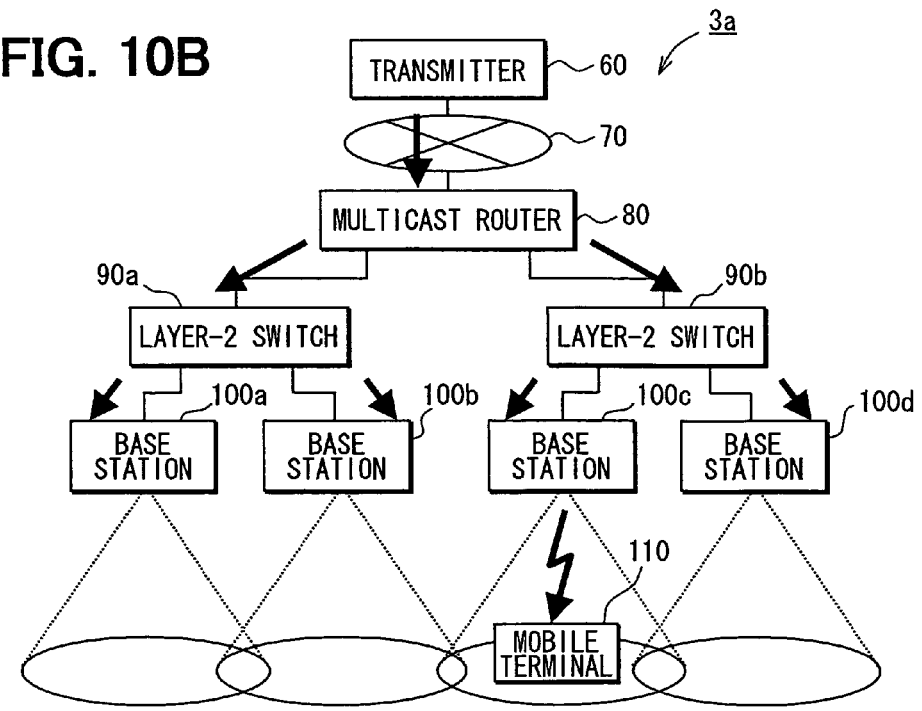

Then, as shown in FIG. 10B, the radio base station 100b halts the delivery addressed to the multicast group G, and the radio base station 100c starts the delivery addressed to the multicast group G. Thereafter, as shown in FIG. 11, the multicast router 80 halts the delivery of the multicast packet addressed to the multicast group G to the side of the layer-2 switch 90a. That is, due to the path formation request from the mobile terminal 110 as a result of switching over the connected radio base station, the mobile terminal 110 receives the multicast packet addressed to the multicast group G through the radio base station 100c.

Further, the radio base station 100b recognizes the mobile terminal that has departed away from its control, and halts the delivery quicker than halting the delivery to the multicast group G which is based on the existing multicast routing technology, preventing the radio band from being inefficiently used.

The same can be true even when the radio base station 100c is connected after the mobile terminal 110 has transmitted a "leave" request concerning the multicast group G outside its control, and the "leave" request and the departure notice are transmitted again via the radio base station 100c.

Figure 12:
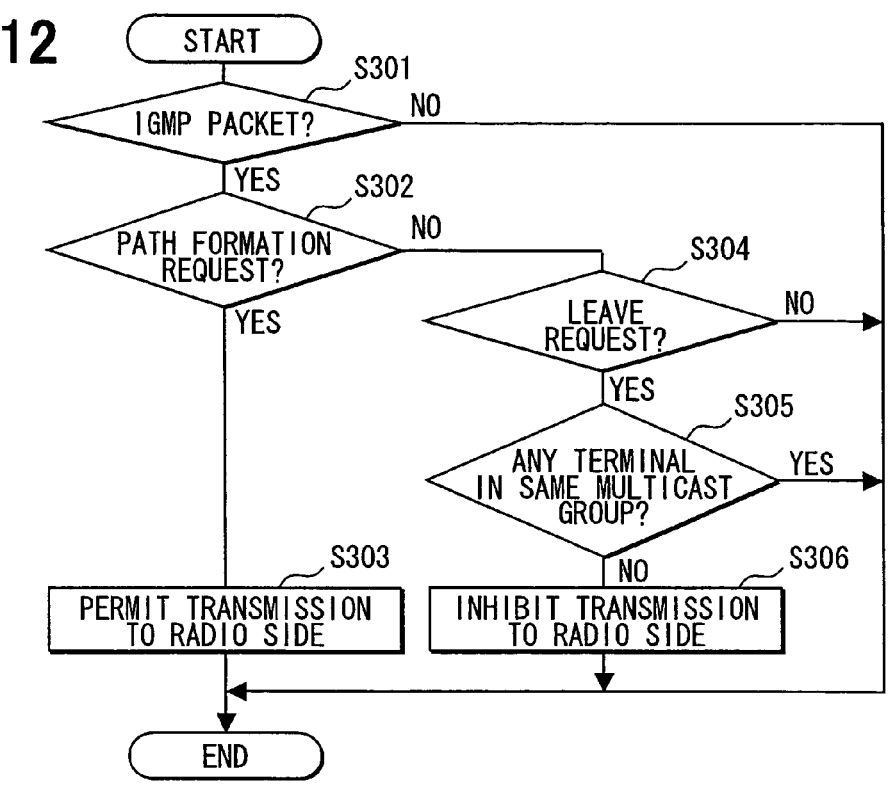
FIG. 12 is a flowchart illustrating a method of delivery to the mobile terminal according to the third embodiment of the invention.

FIG. 12 is a flowchart illustrating the operation of when the IGMP packet (path formation request or "leave" request) is to be received from the radio side of the radio base station in FIG. 7A through FIG. 11. The radio base station checks whether the packet received from the radio side is an IGMP packet (step S301). If it is the IGMP packet, it is checked whether it is the path formation request or the "leave" request (steps S302 and S304). If it is the path formation request, a multicast packet addressed to the requested multicast group is permitted to be transmitted to the radio side (step S303).

If it is the "leave" request, it is checked whether there is any other mobile terminal under its control requesting the reception of the multicast packet addressed to the requested multicast group (step S305). If there is no mobile terminal that requests the reception, the multicast packet addressed to the requested multicast group is inhibited from being transmitted to the radio side (step S306).

Figure 13:
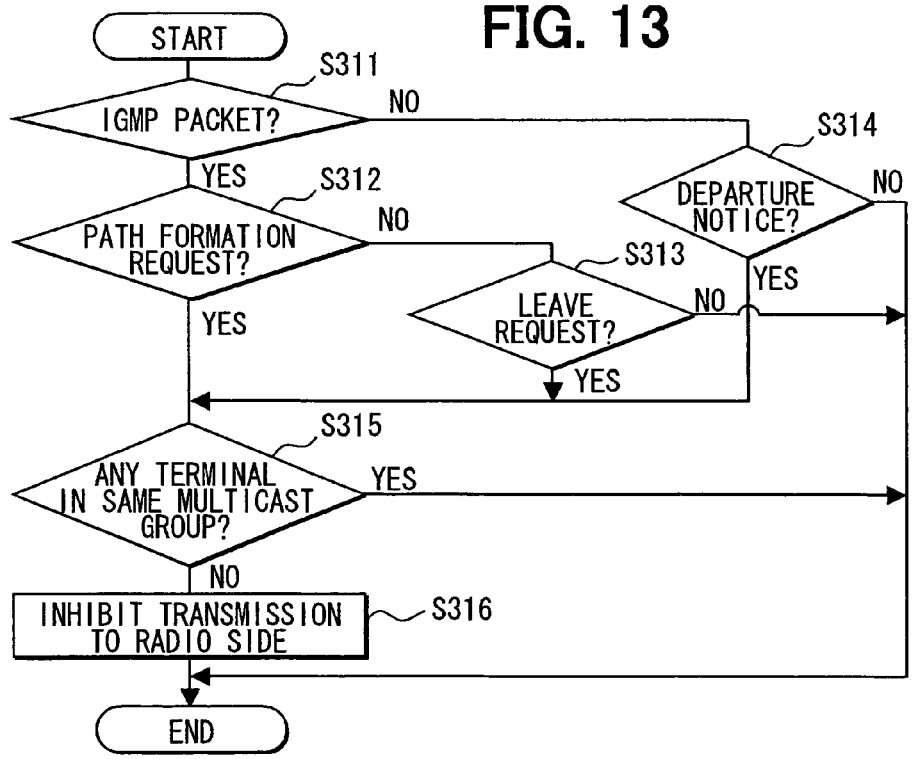
FIG. 13 is a flowchart illustrating a method of delivery to the mobile terminal according to the third embodiment of the invention.

FIG. 13 is a flowchart illustrating the operation of when the IGMP packet (path formation request or "leave" request) and the departure notice are to be received from the wired side of the radio base station in FIG. 7A to FIG. 11. The radio base station checks whether the packet received from the wired side is the IGMP packet (step S311). If it is the IGMP packet, it is checked whether it is the path formation request or the "leave" request (steps S312 and S313). If it is not the IGMP packet, it is checked whether it is a departure notice (step S314). If it is the path formation request, "leave" request or departure notice, it is checked whether there is any other mobile terminal under its control requesting the reception of the multicast packet addressed to the requested multicast group (step S315). If there is no mobile terminal that requests the reception, the multicast packet addressed to the requested multicast group is inhibited from being transmitted to the radio side (step S316).

As the radio base stations perform these processing, reception of the multicast packet can be started readily after the motion and, besides, the multicast delivery path of before being switched over can be quickly deleted to effectively utilize the radio band. Further, the presence of the mobile terminal requesting the multicast packet addressed to the same multicast group has been confirmed by the multicast delivery table before the multicast delivery path is deleted by the radio base station. Therefore, it does not occur that the multicast delivery path is undesirably deleted.

Fourth Embodiment

Figure 14A:
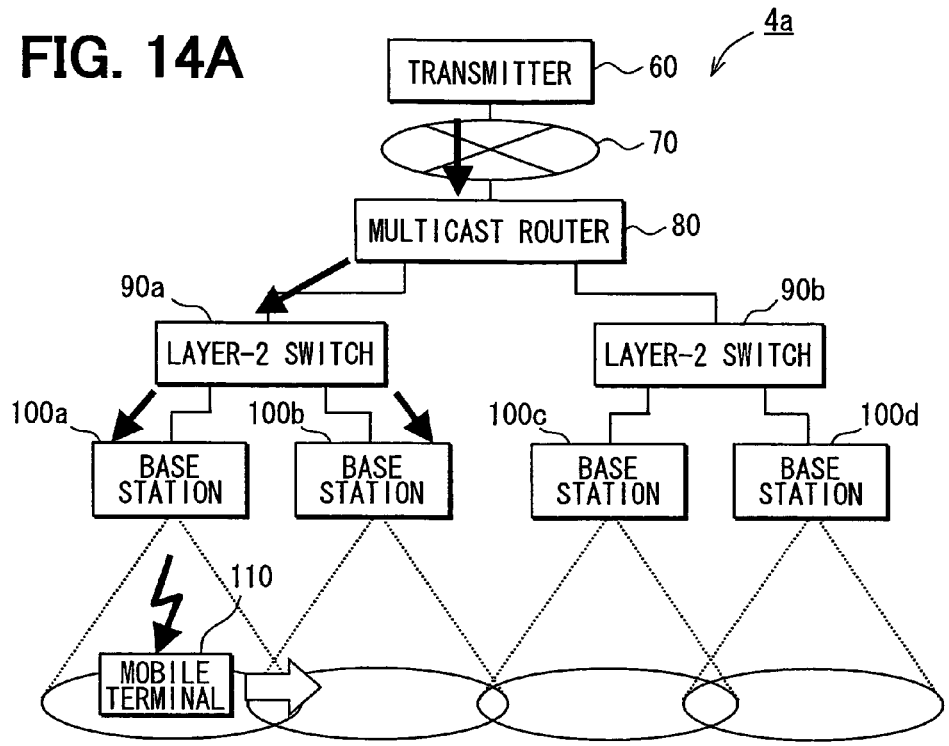
FIG. 14A is a block diagram illustrating the mobile communication system according to a fourth embodiment of the invention.

A mobile communication system 4a according to a fourth embodiment is shown in FIG. 14A. The mobile communication system 4a includes a transmitter 60 for transmitting a multicast packet in multicast communication, a multicast router 80 for delivering (reproducing and transmitting) the multicast packet arriving from the transmitter 60 through the wired network 70, layer-2 switches 90a and 90b for delivering the packet delivered from the multicast router 80 to the radio base stations under its control, and radio base stations 100a, 100b, 100c, 100d for transmitting the packet delivered from the layer-2 switches 90a and 90b to the radio networks under its control. The wired network 70 may often be a complex network by utilizing a plurality of multicast routers or layer-2 switches. A mobile terminal 110, at first, is connected to the radio base station 100a to receive a multicast packet.

The transmitter 60 transmits, for example, a software, a file data like dynamic image, dynamic image obtained in real time, and traffic information such as traffic jam or accident as a multicast packet.

The multicast router 80, as required, reproduces the multicast packet that is received and delivers it to the layer-2 switches 90a and 90b under its control.

The layer-2 switches 90a and 90b copy the multicast packet that is received and deliver it to the radio base stations 100a, 100b, 100c, 100d under its control. Here, even when a plurality of multicast receivers are present under control of the radio base station, the radio base station can deliver the multicast packet through only one time of radio transmission.

Figure 14B:
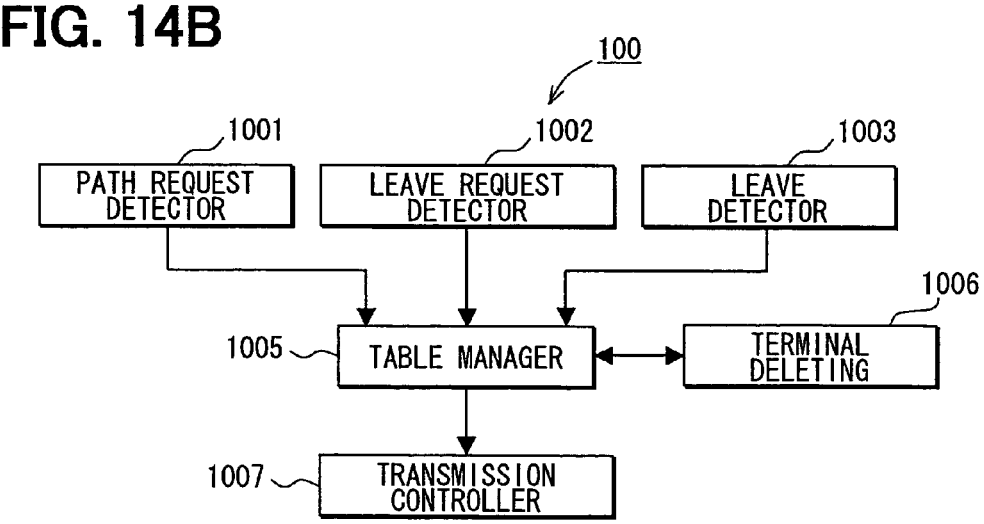
FIG. 14B is a block diagram illustrating the radio base station according to the fourth embodiment of the invention.

Referring to FIG. 14B, the radio base stations 100a, 100b, 100c, 100d, respectively, include, as functional components, a path formation request detector unit 1001 (first request detection means), a "leave" request detector unit 1002 (first request detection means), a "leave" detector unit 1003 (second request detection means), a multicast delivery table manager unit 1005 (multicast delivery table managing means), a mobile terminal deleting unit 1006 (transmission control means) and a transmission controller unit 1007 (transmission control means).

The path formation request detector unit 1001 detects the request from the mobile terminal present under its control for establishing or forming a path for delivering the multicast.

The "leave" request detector unit 1002 detects a request for withdrawing from the multicast group received from the mobile terminal present under its control, and a request for withdrawing from the multicast group received from the mobile terminal present under control of the other radio base station via the other radio base station.

The "leave" detector unit 1003 detects the "leave" of the mobile terminal from the under its control upon receiving the path formation request for multicast delivery from the mobile terminal present under control of the other radio base station through the other radio base station.

The multicast delivery table manager unit 1005 registers to the multicast delivery table in the radio base station which multicast group is requested by the mobile terminal and deletes it therefrom based on the detections by the path formation request detector unit 1001, "leave" request detector unit 1002 and "leave" detector unit 1003.

The mobile terminal deleting unit 1006 detects the "leave" of the mobile terminal from the control of its radio base station based on the presence of beacon response, connection strength to the mobile terminal such as intensity of electric field (e.g., whether the connection strength (reception level) is weaker than a preset threshold value), and deletes it from the multicast delivery table.

The transmission controller unit 1007 checks whether the data signals delivered by multicast be output to the radio side based on the multicast delivery table.

The mobile terminal 110 is a multicast receiver. The mobile terminal 110 transmits a path formation request for multicast delivery to the multicast router 80 via the radio base station to which it is connected so as to receive a multicast packet addressed to a desired multicast group. When the reception of the multicast packet becomes unnecessary, the mobile terminal 110, similarly, transmits a request of "leave" from the multicast group via the connected radio base station. Further, when the mobile terminal 110 has moved to the under control of the radio base station 100b from the control of the radio base station 100a while in multicast communication, the mobile terminal 110 transmits a path formation request for multicast delivery via the newly connected radio base station 100b.

Described below are the operation of the mobile communication system 4a when the mobile terminal 110 in the mobile communication system 4a receives a multicast packet addressed to a predetermined multicast group, and a method of delivery to the mobile terminal realized by using the mobile communication system 4a.

Described below is the operation for switching the connected radio base station from the radio base station 100a over to the radio base station 100b, and to the radio base station 100c as shown in FIG. 14A accompanying the movement of the mobile terminal 110 as indicated by an arrow in the figure in a state where the mobile terminal 110 is a subscriber to the multicast group G and is receiving the multicast packet via the radio base station 100a.

Figure 15A:
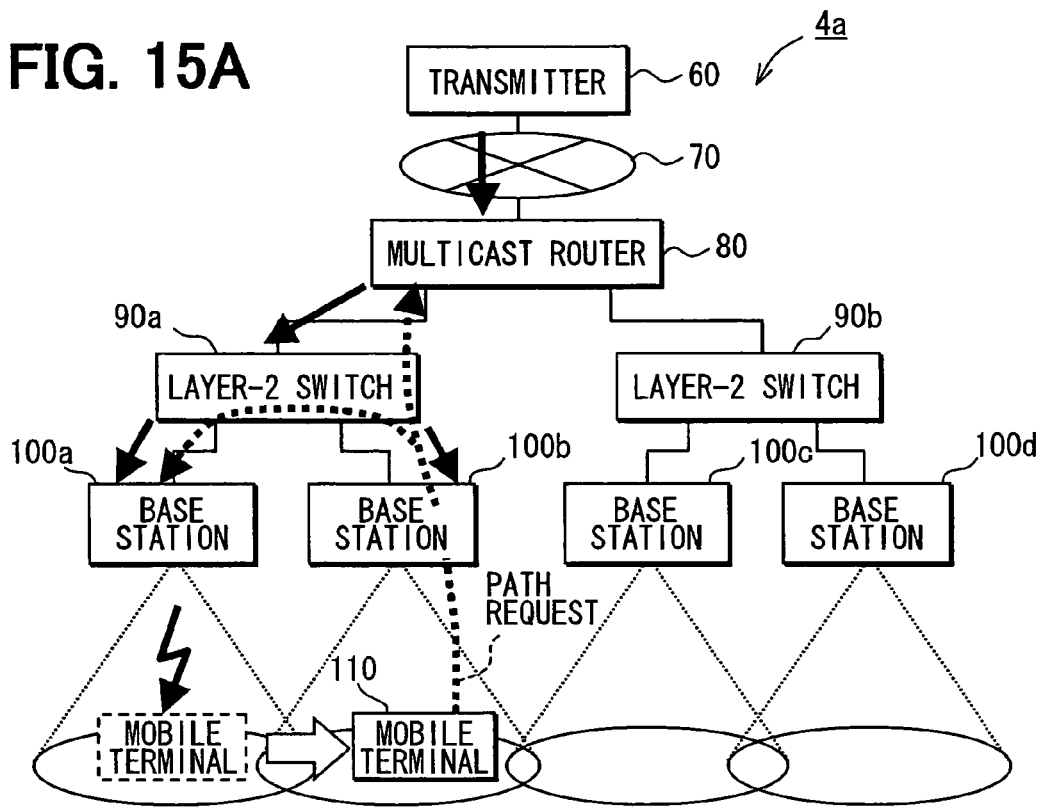
FIGS. 15A and 15B are block diagrams illustrating the mobile communication system according to the fourth embodiment of the present invention.

Referring to FIG. 15A, as the mobile terminal 110 switches the connected radio base station over to the radio base station 100b from the radio base station 100a, the mobile terminal 110 transmits a path formation request related to the multicast group G via the radio base station 100b that is connected after having been switched over as indicated by an arrow of a dotted line. The path formation request reaches the wired port of the radio base station 100a and the multicast router 80 via the layer-2 switch 90a.

Here, the "leave" detector unit 1003 in the radio base station 100a detects the "leave" of the mobile terminal 110 from the under its control, and the multicast delivery table manager unit 1005 deletes the data of mobile terminal 110 from the multicast delivery table. In the radio base station 100b, the path formation request detector unit 1001 detects the path formation request of the mobile terminal 110 for the multicast delivery, and the multicast delivery table manager unit 1005 registers the data of the mobile terminal 110 to the multicast delivery table. In the multicast router 80, on the other hand, the path has been established already, and nothing is done.

Figure 15B:
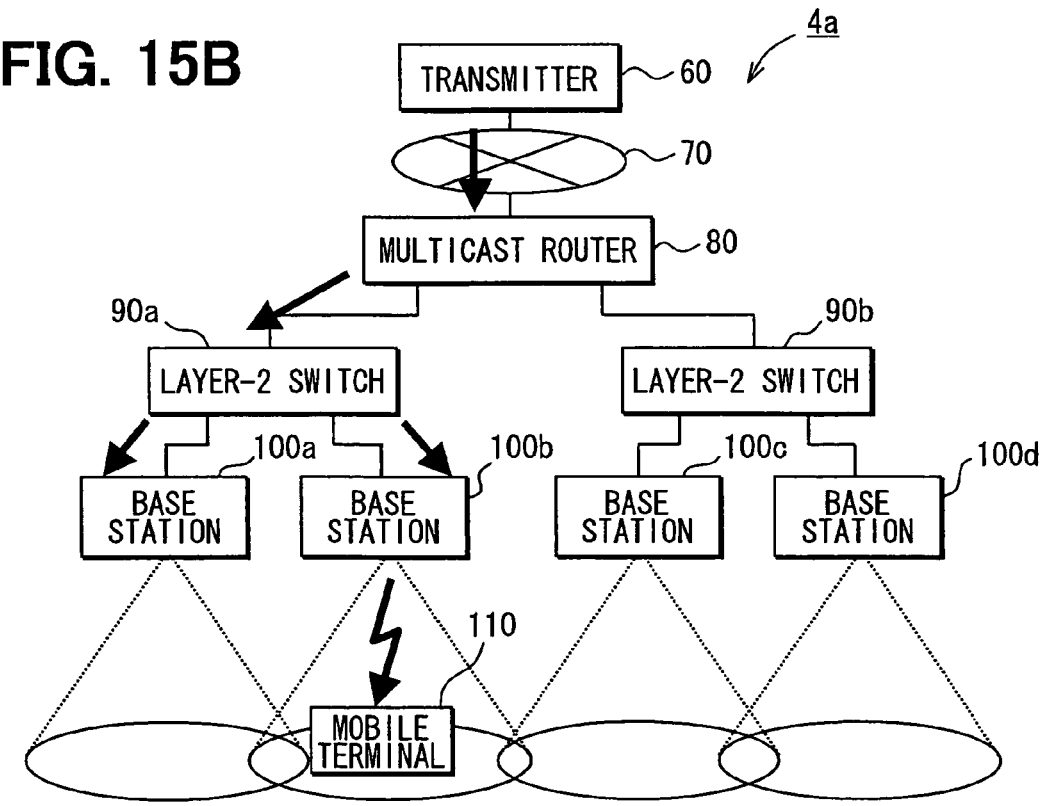

Then, as shown in FIG. 15B, the radio base station 100a halts the delivery addressed to the multicast group G, and the radio base station 100b starts the delivery addressed to the multicast group G. That is, due to only the path formation request from the mobile terminal 110 as a result of switching over the connected radio base station, the mobile terminal 110 receives the multicast packet addressed to the multicast group G through the radio base station 100b. At the same time, it is allowed to recognize the mobile terminal that has withdrawn from the control of the radio base station 100a, and the delivery addressed to the multicast group G can be quickly halted.

When the mobile terminal 110 is connected to the radio base station 100b after it has transmitted a request for "leave" from the multicast group G outside the control of the radio base station, a "leave" request is transmitted again via the radio base station 100b after the mobile terminal 110 is connected to the radio base station 100b. The "leave" request reaches the radio base station 100a, too, like the path formation request described above.

Here, in the radio base station 100a, the "leave" detector unit 1003 detects the "leave" of the mobile terminal 110 from its control, and the multicast delivery table manager unit 1005 deletes the data of the mobile terminal 110 from the multicast delivery table.

It is therefore allowed to recognize the mobile terminal that has departed away from the control of the radio base station 100a, and the delivery to the multicast group G can be quickly halted.

Figure 16A:
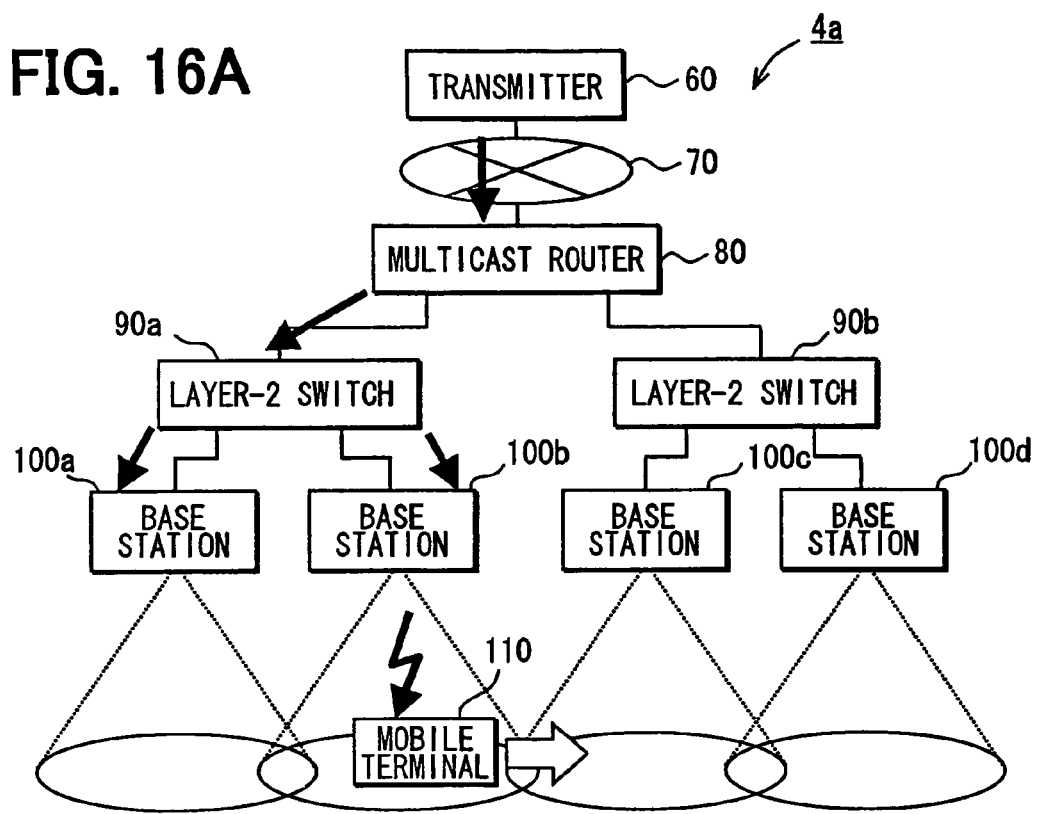
FIGS. 16A and 16B are diagrams illustrating the mobile communication system according to the fourth embodiment of the present invention.
Figure 16B:
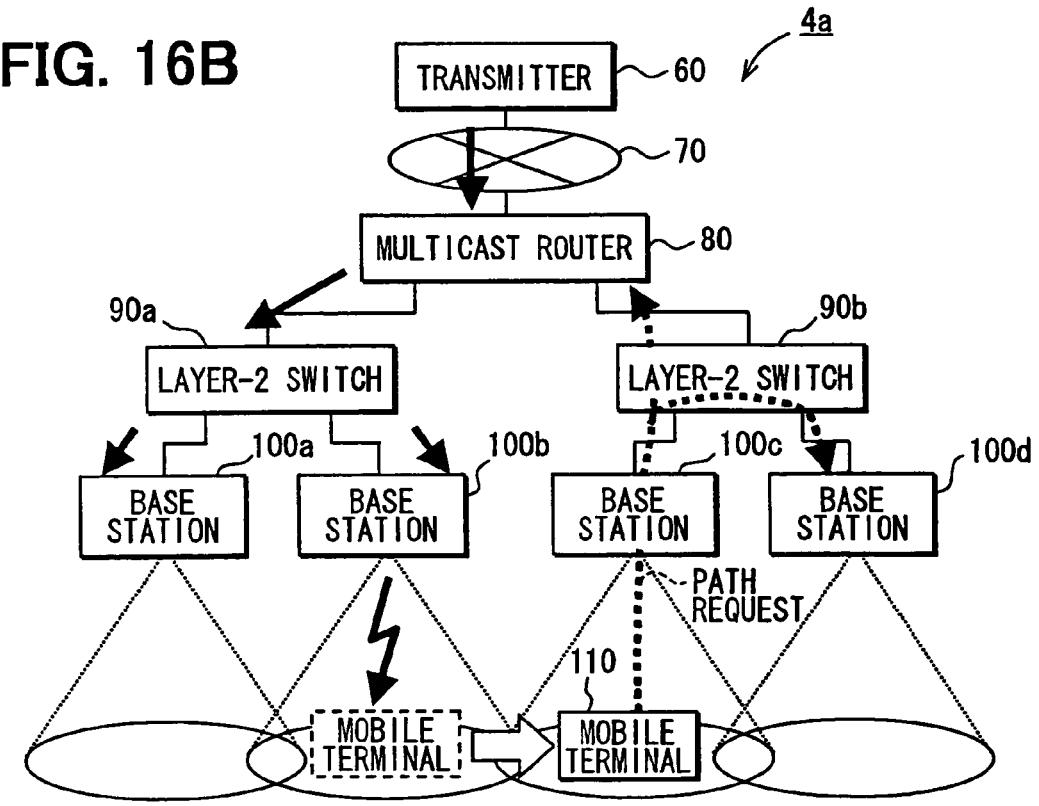

Next, described below is a case where the mobile terminal moves between the radio base stations connected to different subnets as shown in FIG. 16A. As shown in FIG. 16B, after having switched the connected radio base station from the radio base station 100b over to the radio base station 100c, the mobile terminal 110 transmits a path formation request related to the multicast group G though the radio base station 100c that is connected after having been switched over as indicated by an arrow of a dotted line.

Figure 17A:
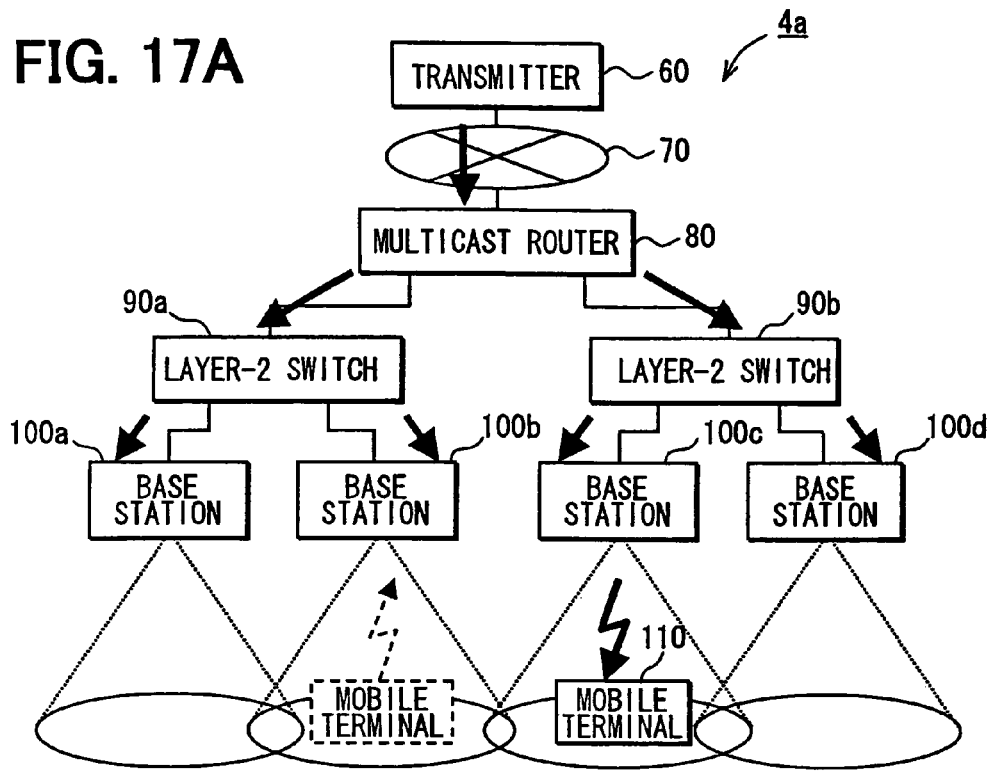
FIGS. 17A and 17B are diagrams illustrating the mobile communication system according to the fourth embodiment of the present invention.

As shown in FIG. 17A, therefore, the radio base station 100c starts the delivery addressed to the multicast group G. However, the path formation request cannot pass through the multicast router and does not reach the radio base station 100b. Therefore, the radio base station 100b cannot halt the delivery addressed to the multicast group G.

When the mobile terminal 110 is connected to the radio base station 100c after it has transmitted a "leave" request related to the multicast group G outside the under control of the radio base station, and the "leave" request is transmitted again via the radio base station 100c, the "leave" request does not reach the radio base station 100b, and the delivery addressed to the multicast group G cannot be halted. This is because, the path formation request and the "leave" request are issued presuming a multicast packet or a broadcast packet as described above.

Therefore, the mobile termination deleting unit 1006 in the radio base station 100b detects the "leave" of the mobile terminal from its control, deletes the data of the mobile terminal 110 from the multicast delivery table, and halts the delivery addressed to the multicast group G. According to this method, delivery addressed to the multicast group G can be halted even when the mobile terminal that is in motion is connected to none of the radio base stations.

Figure 17B:
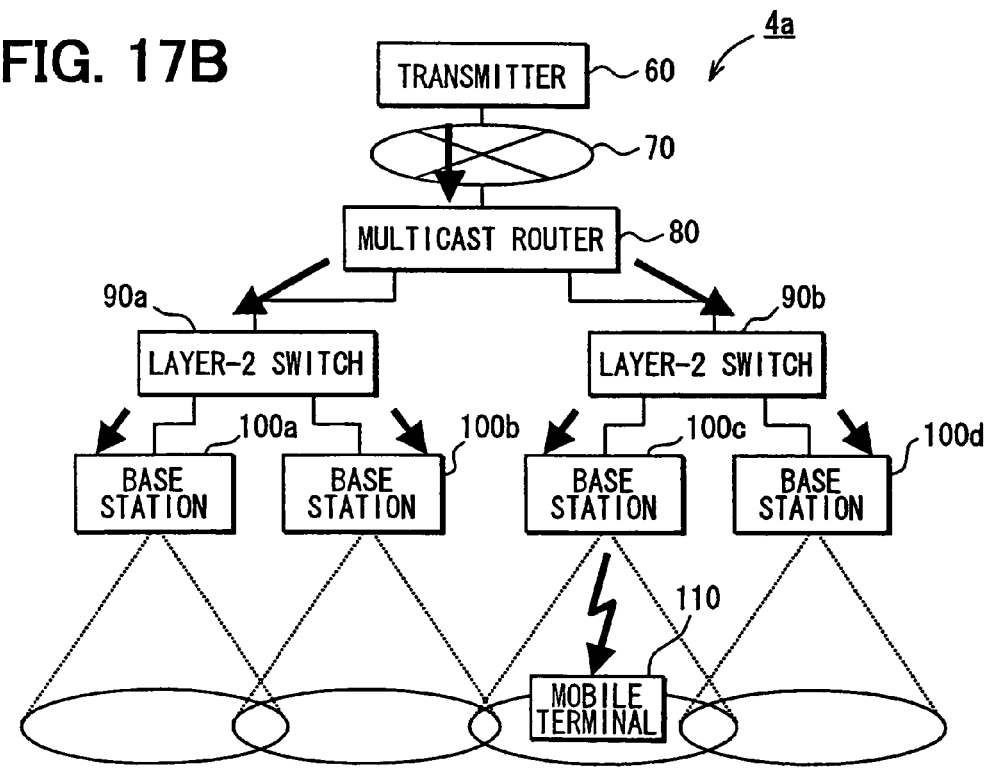
Figure 18:
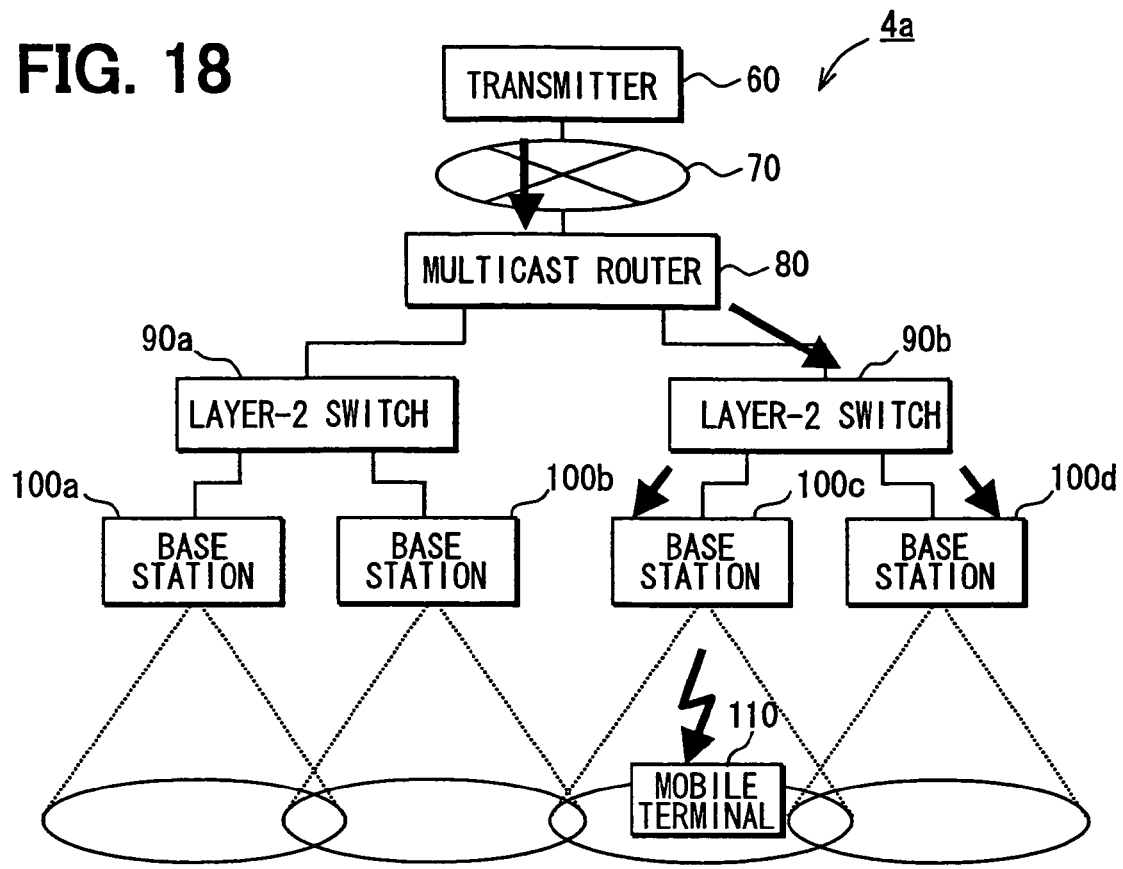
FIG. 18 is a block diagram illustrating the mobile communication system according to the fourth embodiment of the present invention.

As shown in FIG. 17B, therefore, the mobile terminal 110 receives the multicast packet addressed to the multicast group G via the radio base station 100c and, at the same time, halts the delivery addressed to the multicast group G from the radio base station 100b. Thereafter, as shown in FIG. 18, the multicast router 80 halts the delivery of the multicast packet addressed to the multicast group G to the side of the layer-2 switch 90a.

Namely, the radio base station 100b recognizes the mobile terminal that has departed away from its control, and halts the delivery quicker than halting the delivery to the multicast group G which is based on the existing multicast routing technology, preventing the radio band from being inefficiently used.

Figure 19:
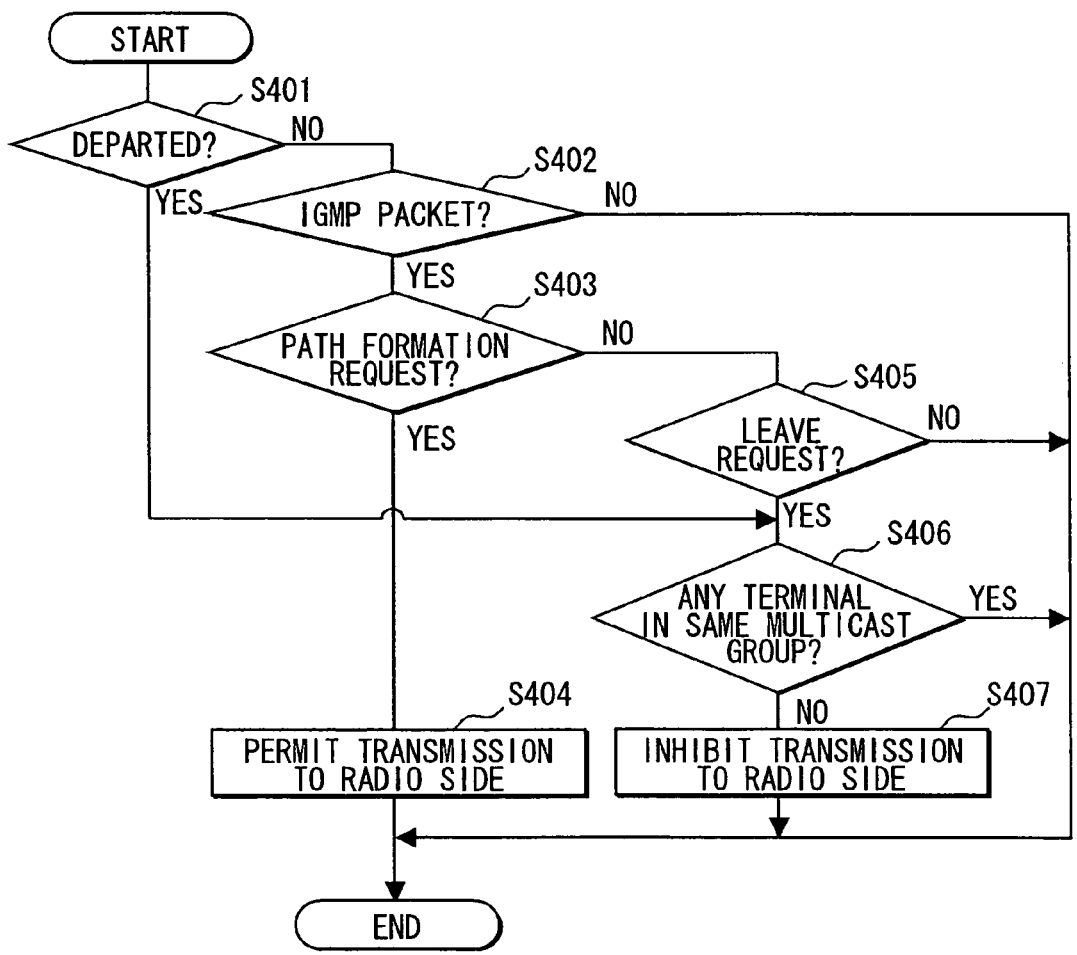
FIG. 19 is a flowchart illustrating a method of delivery to the mobile terminal according to the fourth embodiment of the invention.

FIG. 19 is a flowchart illustrating the operation of when the IGMP packet (path formation request or "leave" request) is to be received from the radio side of the radio base station and when the departure of the mobile terminal from the control of the radio base station is detected and is to be deleted in FIG. 14A through FIG. 18. The radio base station checks whether the packet received from the radio side is an IGMP packet (step S402).

If it is the IGMP packet, it is checked whether it is the path formation request or the "leave" request (steps S403 and S405). If it is the path formation request, a multicast packet addressed to the requested multicast group is permitted to be transmitted to the radio side (step S404).

If it is the "leave" request, it is checked whether there is any other mobile terminal under its control requesting the reception of the multicast packet addressed to the requested multicast group (step S406).

The radio base station monitors the "leave" of the mobile terminal from its control at all times (step S401), and executes processing of step S406 if the "leave" is detected. If there is no mobile terminal that requests the reception, the multicast packet addressed to the requested multicast group is inhibited from being transmitted to the radio side (step S407).

Figure 20:
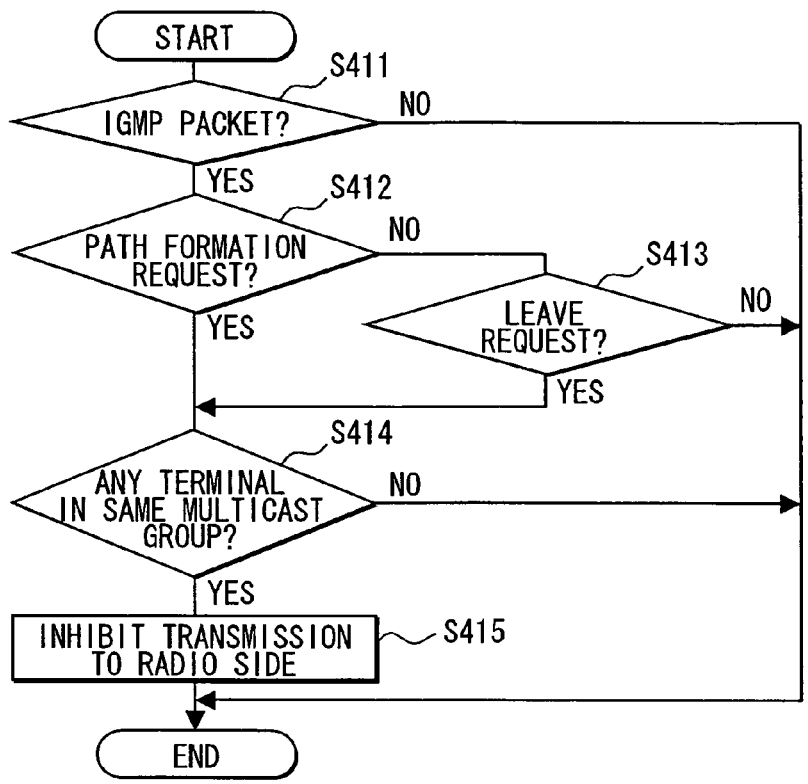
FIG. 20 is a flowchart illustrating a method of delivery to the mobile terminal according to the fourth embodiment of the invention.

FIG. 20 is a flowchart illustrating the operation of when the IGMP packet (path formation request or "leave" request) is to be received from the wired side of the radio base station in FIG. 14A to FIG. 18. The radio base station checks whether the packet received from the wired side is the IGMP packet (step S411).

If it is the IGMP packet, it is checked whether it is the path formation request or the "leave" request (steps S412 and S413). If it is the path formation request or the "leave" request, it is checked whether there is any other mobile terminal under its control requesting the reception of the multicast packet addressed to the requested multicast group (step S414). If there is no mobile terminal that requests the reception, the multicast packet addressed to the requested multicast group is inhibited from being transmitted to the radio side (step S415).

As the radio base stations follow these flowcharts, reception of the multicast packet can be started readily after the motion and, besides, the multicast delivery path of before being switched over can be quickly deleted to effectively utilize the radio band. Further, the presence of the mobile terminal requesting the multicast packet addressed to the same multicast group has been confirmed by the multicast delivery table before the multicast delivery path is deleted by the radio base station. Therefore, it does not occur that the multicast delivery path is undesirably deleted.

Fifth Embodiment

Figure 21:
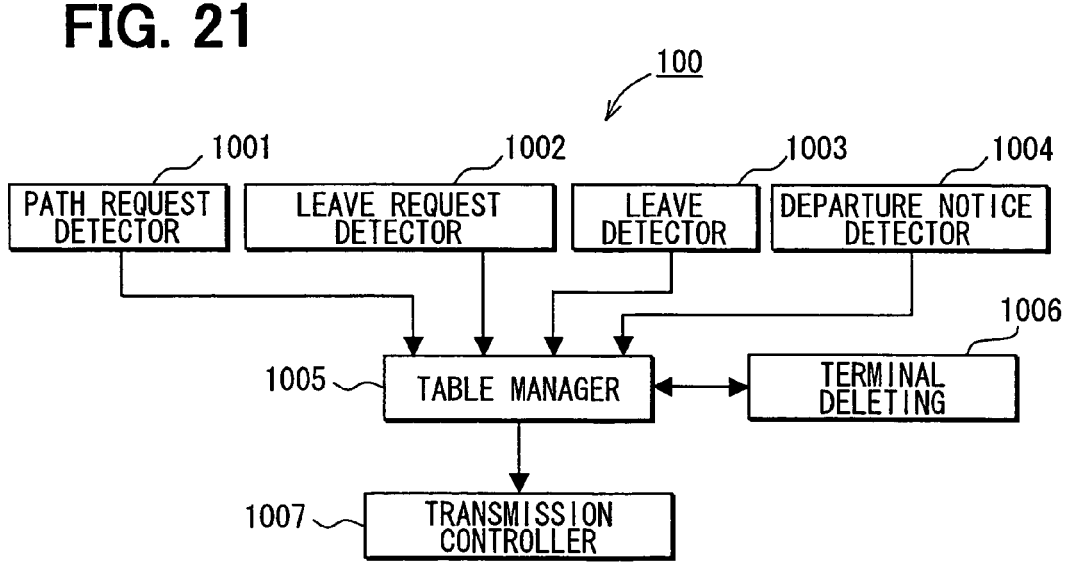
FIG. 21 is a block diagram illustrating the radio base station according to a fifth embodiment of the invention.

As shown in FIG. 21, a mobile communication system may be constructed such that the radio base station 100 includes both the departure notice detector unit 1004 (FIG. 7B) of the third embodiment and the mobile terminal deleting unit 1006 (FIG. 14B) of the fourth embodiment.

Sixth Embodiment

Further a mobile communication system may be constructed such that a mobile terminal transmits a multicast packet in multicast communication instead of using a transmitter employed in the first to fifth embodiments. In this case, the mobile terminal transmits the multicast packet by utilizing an uplink to the radio base station. In other respects, however, the system operates in a manner as described in the first to fifth embodiments.

What is claimed is:

1. A mobile communication system comprising:
a relay device capable of delivering data signals that are received to a network in response to data signals addressed to a predetermined multicast group transmitted from a transmitter, and of delivering various kinds of requests received from the network to a transmitter side and to the network;
a plurality of radio base stations connected to the relay device, and capable of delivering the data signals delivered from the relay device to the network; and
a mobile terminal that receives the data signals delivered from the radio base station, the mobile terminal including means for transmitting a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals,
wherein each of the radio base stations includes,
first means for detecting various kinds of requests inclusive of the path formation request transmitted from the mobile terminal,
means for transmitting various kinds of requests detected by the first detecting means to the relay device,
second means for detecting various kinds of requests delivered from various-requests transmission means in another radio base station,
means for registering the group identification data included in the path formation request to a multicast delivery table thereof when the first detecting means detects the path formation request transmitted from the mobile terminal, and deletes the group identification data included in the path formation request from the multicast delivery table thereof immediately without further communication in the network when the second detecting means detects the path formation request transmitted from the transmitting means in the another radio base station, the registering means inhibiting deletion of the group identification data when there remains in the multicast delivery table another mobile terminal in the predetermined multicast group that wishes to continue to receive a multicast packet in the network, and means for transmitting a multicast packet received from the relay device to the network only when the multicast packet received from the relay device is a multicast packet addressed to the multicast group which is the same as the multicast group registered to the multicast delivery table thereof as the group identification data.

2. A mobile communication system comprising:

a relay device capable of delivering data signals that are received to a network in response to data signals addressed to a predetermined multicast group transmitted from a transmitter, and of delivering various kinds of requests received from the network to a transmitter side and to the network;

a plurality of radio base stations connected to the relay device, and capable of delivering the data signals delivered from the relay device to the network; and a mobile terminal that receives the data signals delivered from at least one of the radio base stations, wherein the mobile terminal includes first means for transmitting a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals, and second means for transmitting which, at the time of switching over the radio base station to the another radio base station, transmits a departure notice expressing leave to the radio base station via the another radio base station which is connected after having been switched over, and wherein each of the radio base stations includes, first means for detecting various kinds of requests inclusive of the path formation request and departure notice, and transmitted from the middle terminal, means for transmitting various kinds of requests detected by the first detecting means to the relay device, second means for detecting various kinds of requests delivered from various-requests transmission means in another radio base station, means for registering the group identification data included in the path formation request to a multicast delivery table thereof when the first detecting means detects the path formation request transmitted from the mobile terminal, and deletes the group identification data included in the path formation request from the multicast delivery table thereof immediately without further communication in the network when the second detecting means detects the departure notice addressed thereto transmitted from the another radio base station, the registering means inhibiting deletion of the group identification data when there remains in the multicast delivery table another mobile terminal in the predetermined multicast group that wishes to continue to receive a multicast packet in the network, and means for transmitting a multicast packet received from the relay device to the network only when the multicast packet received from the relay device is a multicast packet addressed to the multicast group which is the same as the multicast group registered to the multicast delivery table thereof as the group identification data.

3. The mobile communication system according to claim 2, wherein the relay device includes a multicast router capable of delivering the data signals that are received to the network in response to data signals addressed to the predetermined multicast group transmitted from the transmitter when the mobile terminal belonging to the multicast group is present, and of transmitting the path formation request received through the network to a unit only that is connected to the transmitter side and of transmitting the departure notice that is received to a previously-connected radio base station; and a layer-2 switch arranged downstream of the multicast router capable of transmitting the data signals received via the multicast router to the network and of delivering the various requests received from the network to the transmitter side and to the network.

4. The mobile communication system according to claim 1, wherein each of the radio base stations include means for detecting the leave of the mobile terminal from its control based on connection strength to the mobile terminal, and wherein the registering means deletes, from the multicast delivery table thereof, the group identification data corresponding to the multicast group to which the mobile terminal is belonging when the means for detecting the leave has detected the leave of the mobile terminal.

5. The mobile communication system according to claim 1, wherein the mobile terminal includes means for transmitting a leave request that includes group identification data corresponding to the multicast group to which the mobile terminal belongs and requests the leave from the multicast group based on an external instruction, and wherein the registering means in the radio base station deletes, from the multicast delivery table thereof, the group identification data included in the leave request even when the first detecting means has received the leave request transmitted from the mobile terminal.

6. The mobile communication system according to claim 1, wherein the relay device includes a plurality of relay means connected in a tree form.

7. A base station for a mobile communication system, the mobile communication system including a relay device capable of delivering data signals that are received to a network in response to data signals addressed to a predetermined multicast group transmitted from a transmitter, and of delivering various kinds of requests received from the network to a transmitter side and to the network, a radio base station connected to the relay device, and capable of delivering the data signals delivered from the relay device to the radio network, and a mobile terminal that receives the data signals delivered from the radio base station, and transmits a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals, the base station comprising:

first means for detecting various kinds of requests inclusive of the path formation request transmitted from the mobile terminal;

means for transmitting various kinds of requests detected by the first detecting means to the relay device;

second means for detecting various kinds of requests delivered from various-requests transmission means in another radio base station;

means for registering the group identification data included in the path formation request to a multicast delivery table thereof when the first detecting means detects the path formation request transmitted from the mobile terminal, and deletes the group identification data included in the path formation request from the multicast delivery table thereof immediately without further communication in the network when the second detecting means detects the path formation request transmitted from the various-requests transmission means in the another radio base station, the registering means inhibiting deletion of the group identification data when there remains in the multicast delivery table another mobile terminal in the predetermined multicast group that wishes to continue to receive a multicast packet in the network; and means for transmitting a multicast packet received from the relay device to the network only when the multicast packet received from the relay device is a multicast packet addressed to the multicast group which is the same as the multicast group registered to the multicast delivery table thereof as the group identification data.

8. A radio base station for a mobile communication system, the mobile communication system including a relay device capable of delivering data signals that are received to a network in response to data signals addressed to a predetermined multicast group transmitted from a transmitter, and of delivering various kinds of requests received from the network to a transmitter side and to the network, a radio base station connected to the relay device, and capable of delivering the data signals delivered from the relay device to the network, and a mobile terminal that receives the data signals delivered from the radio base station, transmits a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals, and, at the time of switching over the radio base station to the another radio base station, transmits a departure notice expressing leave to the radio base station via the another radio base station which is connected after having been switched over, the radio base station comprising:

first detecting means for detecting various kinds of requests inclusive of the path formation request and departure notice, and transmitted from the mobile terminal;

means for transmitting various kinds of requests detected by the first detecting means to the relay device;

second means for detecting various kinds of requests delivered from various-requests transmission means in another radio base station;

means for registering the group identification data included in the path formation request to a multicast delivery table thereof when the first detecting means detects the path formation request transmitted from the mobile terminal, and deletes the group identification data included in the path formation request from the multicast delivery table thereof immediately without further communication in the network when the second detecting means detects the departure notice addressed thereto transmitted from the another radio base station, the registering means inhibiting deletion of the group identification data when there remains in the multicast delivery table another mobile terminal in the predetermined multicast group that wishes to continue to receive a multicast packet in the network; and means for transmitting a multicast packet received from the relay device to the network only when the multicast packet received from the relay device is a multicast packet addressed to the multicast group which is the same as the multicast group registered to the multicast delivery table thereof as the group identification data.

9. The radio base station according to claim 8, further comprising:

means for detecting the leave of the mobile terminal based on connection strength to the mobile terminal, wherein the means for registering deletes, from the multicast delivery table thereof, the group identification data corresponding to the multicast group to which the mobile terminal is belonging when the means for detecting the leave has detected the leave of the mobile terminal.

10. A delivery method of a base station in a mobile communication system, the mobile communication system including a relay device capable of delivering data signals that are received to a network in response to data signals addressed to a predetermined multicast group transmitted from a transmitter, and of delivering various kinds of requests received from the network to a transmitter side and to the network, a radio base station connected to the relay device, and capable of delivering the data signals delivered from the relay device to the network, and a mobile terminal that receives the data signals delivered from the radio base station, and transmits a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals, the delivery method comprising:

detecting various kinds of first requests inclusive of the path formation request transmitted from the mobile terminal;

transmitting various kinds of first requests detected by the detecting step to the relay device;

detecting various kinds of second requests delivered from another radio base station;

registering the group identification data included in the path formation request to a multicast delivery table thereof when the detecting step detecting various kinds of first requests detects the path formation request transmitted from the mobile terminal, and for deleting the group identification data included in the path formation request from the multicast delivery table thereof immediately without further communication in the network when the detecting step detecting various kinds of second requests detects the path formation request transmitted from the another radio base station; and transmitting a multicast packet received from the relay device to the network only when the multicast packet received from the relay device is a multicast packet addressed to the multicast group which is the same as the multicast group registered to the multicast delivery table thereof as the group identification data.

11. A delivery method of a radio base station in a mobile communication system, the mobile communication system including a relay device capable of delivering data signals that are received to a network in response to data signals addressed to a predetermined multicast group transmitted from a transmitter, and of delivering various kinds of requests received from the network to a transmitter side and to the network, a radio base station connected to the relay device, and capable of delivering the data signals delivered from the relay device to the network, and a mobile terminal that receives the data signals delivered from the radio base station, transmits a path formation request which includes group identification data for identifying a predetermined multicast group at the time of taking part in the predetermined multicast group and at the time of switching over a radio base station to which it is connected while receiving data signals transmitted being addressed to the predetermined multicast group, the path formation request further requesting formation of a path for receiving the delivery of the data signals, and, at the time of switching over the radio base station to the another radio base station, transmits a departure notice expressing leave to the radio base station via the another radio base station which is connected after having been switched over, the delivery method comprising:

detecting various kinds of first requests inclusive of the path formation request and departure notice, and transmitted from the mobile terminal;

transmitting various kinds of first requests detected by the detecting step to the relay device;

detecting various kinds of second requests delivered from another radio base station;

registering the group identification data included in the path formation request to a multicast delivery table thereof when the detecting step detecting various kinds of first requests detects the path formation request transmitted from the mobile terminal, and for deleting the group identification data included in the path formation request from the multicast delivery table thereof immediately without further communication in the network when the detecting step detecting various kinds of second requests detects the departure notice addressed thereto transmitted from the another radio base station; and transmitting a multicast packet received from the relay device to the network only when the multicast packet received from the relay device is a multicast packet addressed to the multicast group which is the same as the multicast group registered to the multicast delivery table thereof as the group identification data.

12. The delivery method according to claim 11, further comprising:

detecting the leave of the mobile terminal based on connection strength to the mobile terminal, wherein the registering step deletes, from the multicast delivery table thereof, the group identification data corresponding to the multicast group to which the mobile terminal is belonging when the leave detecting means has detected the leave of the mobile terminal.

13. The delivery method according to claim 10, wherein the registering step inhibits deletion of the group identification data when there remains in the multicast delivery table another mobile terminal in the predetermined multicast group that wishes to continue to receive a multicast packet.

14. The delivery method according to claim 11, wherein the registering step inhibits deletion of the group identification data when there remains in the multicast delivery table another mobile terminal in the predetermined multicast group that wishes to continue to receive a multicast packet.

* * * * *